US010254905B2

(12) United States Patent
Choi et al.

(10) Patent No.: US 10,254,905 B2
(45) Date of Patent: Apr. 9, 2019

(54) TOUCH DISPLAY APPARATUS AND METHOD OF MANUFACTURING THE SAME

(71) Applicant: Samsung Display Co., Ltd., Yongin-si (KR)

(72) Inventors: Moon Sung Choi, Incheon (KR); Gyeong-Ub Moon, Suwon-si (KR); Sangho Park, Seongnam-si (KR); Ji Hong Park, Suwon-si (KR); Sang Min Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 48 days.

(21) Appl. No.: 15/444,745

(22) Filed: Feb. 28, 2017

(65) Prior Publication Data

US 2017/0255298 A1 Sep. 7, 2017

(30) Foreign Application Priority Data

Mar. 4, 2016 (KR) ........................ 10-2016-0026173

(51) Int. Cl.
*G06F 3/044* (2006.01)
*G06F 3/041* (2006.01)
*G09G 3/36* (2006.01)

(52) U.S. Cl.
CPC ............ *G06F 3/044* (2013.01); *G06F 3/0414* (2013.01); *G06F 3/0416* (2013.01); *G06F 3/0418* (2013.01); *G06F 2203/04103* (2013.01); *G09G 3/3648* (2013.01); *G09G 2300/0426* (2013.01)

(58) Field of Classification Search
CPC ............................... G06F 3/041; G06F 3/0414
USPC ...................................... 345/156–184
See application file for complete search history.

(56) References Cited

U.S. PATENT DOCUMENTS

| 2014/0232691 | A1 | 8/2014 | Lee | |
| 2016/0179276 | A1* | 6/2016 | Nathan | G06F 3/0414 345/174 |
| 2016/0328065 | A1* | 11/2016 | Johnson | G06F 3/03545 |
| 2016/0357331 | A1* | 12/2016 | Kano | G06F 3/044 |
| 2017/0045992 | A1* | 2/2017 | Lee | G06F 3/0416 |

(Continued)

FOREIGN PATENT DOCUMENTS

| KR | 10-2013-0035243 | 4/2013 |
| KR | 10-2013-0044267 | 5/2013 |

*Primary Examiner* — Carolyn R Edwards
(74) *Attorney, Agent, or Firm* — H.C. Park & Associates, PLC

(57) ABSTRACT

A touch display apparatus includes a display panel, a touch electrode, a first pressure sensing electrode, a polarizer and a second pressure sensing electrode. The display panel includes a display region and a peripheral region, and displays an image. The touch electrode is disposed on the display region of the display panel, includes a plurality of touch patterns, and detects a touch position. The first pressure sensing electrode is disposed on the peripheral region of the display panel. The touch electrode and the first pressure sensing electrode are disposed in the same layer. The polarizer is disposed on the touch electrode and the first pressure sensing electrode, and includes a dielectric elastomer material. The second pressure sensing electrode is disposed on the polarizer, and overlaps the first pressure sensing electrode.

20 Claims, 15 Drawing Sheets

(56) References Cited

U.S. PATENT DOCUMENTS

2017/0322662 A1* 11/2017 Hsieh .................... G02B 6/0088
2018/0095557 A1* 4/2018 Wang .................... G06F 3/0414

* cited by examiner

TOUCH DISPLAY APPARATUS AND METHOD OF MANUFACTURING THE SAME

CROSS-REFERENCE TO RELATED APPLICATION

This application claims priority from and the benefit of Korean Patent Application No. 10-2016-0026173, filed on Mar. 4, 2016, which is hereby incorporated by reference for all purposes as if fully set forth herein.

BACKGROUND

Field

The invention relates generally to a display apparatus, and, more particularly, to a touch display apparatus and a method of manufacturing the touch display apparatus capable of reducing or eliminating distortions in sensing touches applied to a touch screen.

Discussion of the Background

As demands on various types of display devices have increased with the development of an information intensive society, research has been conducted on display devices, such as liquid crystal display devices, plasma display panels, field emission display devices, electrophoretic display devices, organic light emitting display devices, and the like.

This research has given rise to an ability to apply a touch screen panel function to such display devices. A touch screen panel is an input device that enables a command to be input by touching (or almost touching) a screen of a display device using an object, such as a finger, a pen, etc. In this manner, a touch screen panel can serve as a substitute for a separate input device connected to a display device, such as a keyboard, a mouse, and the like.

Touch screen panels may be resistive overlay touch screen panels, photosensitive touch screen panels, capacitive touch screen panels, and the like. Among the various types of touch screen panels, capacitive touch screen panels are configured to convert information regarding (a) position(s) of touch interaction into an electrical signal by sensing a change in capacitance formed between a conductive sensing pattern and an adjacent sensing pattern, ground electrode, or the like, when an object, such as a user appendage, pen, etc., comes in contact with (or almost contacts, e.g., hovers above) the touch screen panel.

The change in capacitance is typically based on one of two principles. The first approach involves monitoring change of capacitance by the sensing system through direct electrical contact with a large capacitive object, usually a person through his/her finger. In certain cases, this type of sensor may also function to detect the proximity of an object to the touch sensor, thus, not requiring physical contact with the touch sensor. Because these systems often require a direct contact between a user and the sensing system, they might not work if, for example, the user is wearing a glove. Additionally, capacitive coupling might not be well suited for quantitatively measuring the applied pressure or proximity, but is capable of binary (on/off) sensing.

The second approach is associated with utilizing two conductive planes separated by a compressible and resilient dielectric. This composite forms a capacitor, in which the capacitance thereof depends in part on the distance between the conductive planes. When a pressure is applied, the compression to the dielectric changes the capacitance between the planes, which can be detected by the sensing system. By calibrating the compression with the applied force or pressure, this system can be used to quantify the force or pressure of the interaction with the sensor.

A touch screen panel may include a plurality of sensing patterns for detecting electrical contacts, and parasitic capacitances may occur between adjacent sensing patterns. Since the number of sensing patterns adjacent to a peripheral sensing pattern is different from the number of sensing patterns adjacent to a central sensing pattern, a parasitic capacitance of the peripheral sensing pattern may be different from a parasitic capacitance of the central sensing pattern. Given the small size of the electrical components in the touch screen panels, such a difference may cause a distortion or inaccurate reading (hereinafter "touch distortion") at a peripheral region of the touch screen panel in which the peripheral sensing pattern is disposed.

The above information disclosed in this Background section is only for enhancement of understanding of the background of the inventive concept, and, therefore, it may contain information that does not form the prior art that is already known in this country to a person of ordinary skill in the art.

SUMMARY

Devices constructed according to the principles of the invention provide a touch display apparatus that eliminates or reduces touch distortion at a peripheral region of a touch screen panel.

One or more exemplary embodiments of the invention provide a touch display apparatus capable of having improved performance by eliminating or reducing differences in parasitic capacitance between sensing patterns in a peripheral region of a touch screen display panel and central regions of the touch screen display panel.

One or more exemplary embodiments of the invention provide a method of manufacturing a touch display apparatus that applies the same signal (e.g., a touch sensing signal) to the touch electrode and the first pressure sensing electrode. Accordingly, a parasitic capacitance of a peripheral touch pattern may be substantially the same as a parasitic capacitance of a central touch pattern, and a touch distortion may thus be reduced or eliminated at the peripheral region.

One or more exemplary embodiments provide a touch display apparatus including a polarizer disposed between the first pressure sensing electrode and the second pressure sensing electrode, and may include a dielectric elastomer material. Accordingly, an additional dielectric elastomer layer may be omitted, and thus the thickness of the touch display apparatus and manufacturing costs may be reduced.

Additional aspects will be set forth in the detailed description which follows, and, in part, will be apparent from the disclosure, or may be learned by practice of the inventive concept.

According to one aspect of the invention, a touch display apparatus includes a display panel, a touch electrode, a first pressure sensing electrode, a polarizer and a second pressure sensing electrode. The display panel includes a display region and a peripheral region, and displays an image. The touch electrode is disposed on the display region of the display panel, includes a plurality of touch patterns, and detects a touch position. The first pressure sensing electrode is disposed on the peripheral region of the display panel. The touch electrode and the first pressure sensing electrode are disposed in a same layer. The polarizer is disposed on the touch electrode and the first pressure sensing electrode, and includes a dielectric elastomer material. The second pressure sensing electrode is disposed on the polarizer, and overlaps the first pressure sensing electrode.

In an exemplary embodiment, the first pressure sensing electrode may include a plurality of pressure sensing patterns.

In an exemplary embodiment, the second pressure sensing electrode may be disposed only on the peripheral region of the display panel.

In an exemplary embodiment, the touch display apparatus may further include a sensing driver configured to generate signals and connected to the touch electrode and the first pressure sensing electrode. The touch electrode and the first pressure sensing electrode may be configured to receive substantially the same signal from the sensing driver.

In an exemplary embodiment, the touch display apparatus may further include a window member disposed on the second pressure sensing electrode.

In an exemplary embodiment, the touch display apparatus may further include a transparent adhesive layer disposed between the window member and the second pressure sensing electrode.

In an exemplary embodiment, the touch display apparatus may further include a transparent adhesive layer disposed between the second pressure sensing electrode and the polarizer.

In an exemplary embodiment, the touch display apparatus may further include an adhesive member disposed on the peripheral region of the display panel, and disposed between the window member and the second pressure sensing electrode.

In an exemplary embodiment, the touch display apparatus may further include an adhesive member disposed on the peripheral region of the display panel, and disposed between the second pressure sensing electrode and the polarizer.

In an exemplary embodiment, the touch electrode, the first pressure sensing electrode and the second pressure sensing electrode may include a same material.

According to another aspect of the invention, a method of manufacturing a touch display apparatus includes, forming a display panel including a display region and a peripheral region. The display panel displays an image. A touch electrode and a first pressure sensing electrode are formed on the display panel. A polarizer is formed on the touch electrode and the first pressure sensing electrode. The polarizer includes a dielectric elastomer material. A second pressure sensing electrode is formed on the polarizer. The second pressure sensing electrode overlaps the first pressure sensing electrode. The touch electrode is disposed on the display region of the display panel and includes a plurality of touch patterns. The first pressure sensing electrode is disposed on the peripheral region of the display panel.

In an exemplary embodiment, the first pressure sensing electrode may include a plurality of pressure sensing patterns.

In an exemplary embodiment, the second pressure sensing electrode may be disposed only on the peripheral region of the display panel.

In an exemplary embodiment, a sensing driver connected to the touch electrode and the first pressure sensing electrode may be formed. A same signal may be applied to the touch electrode and the first pressure sensing electrode.

In an exemplary embodiment, a window member may be formed on the second pressure sensing electrode.

In an exemplary embodiment, a transparent adhesive layer may be formed between the window member and the second pressure sensing electrode.

In an exemplary embodiment, a transparent adhesive layer may be formed between the second pressure sensing electrode and the polarizer.

In an exemplary embodiment, an adhesive member may be formed on the peripheral region of the display panel. The adhesive member may be disposed between the window member and the second pressure sensing electrode.

In an exemplary embodiment, an adhesive member may be formed on the peripheral region of the display panel. The adhesive member may be disposed between the second pressure sensing electrode and the polarizer.

According to still another aspect of the invention, a method of operating a touch display apparatus having a display panel including a display region and a peripheral region, a touch electrode disposed on the display region of the display panel and including a plurality of touch patterns to detect a touch position, a pressure sensing electrode disposed on the peripheral region of the display panel, and sensing driver configured to generate signals and connected to the touch electrode and the first pressure sensing electrode, includes the steps of displaying an image on the display panel to display an image, applying substantially the same driving signals to the touch electrode and the pressure sensing electrode, and detecting a touch position applied by the user to the display panel.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
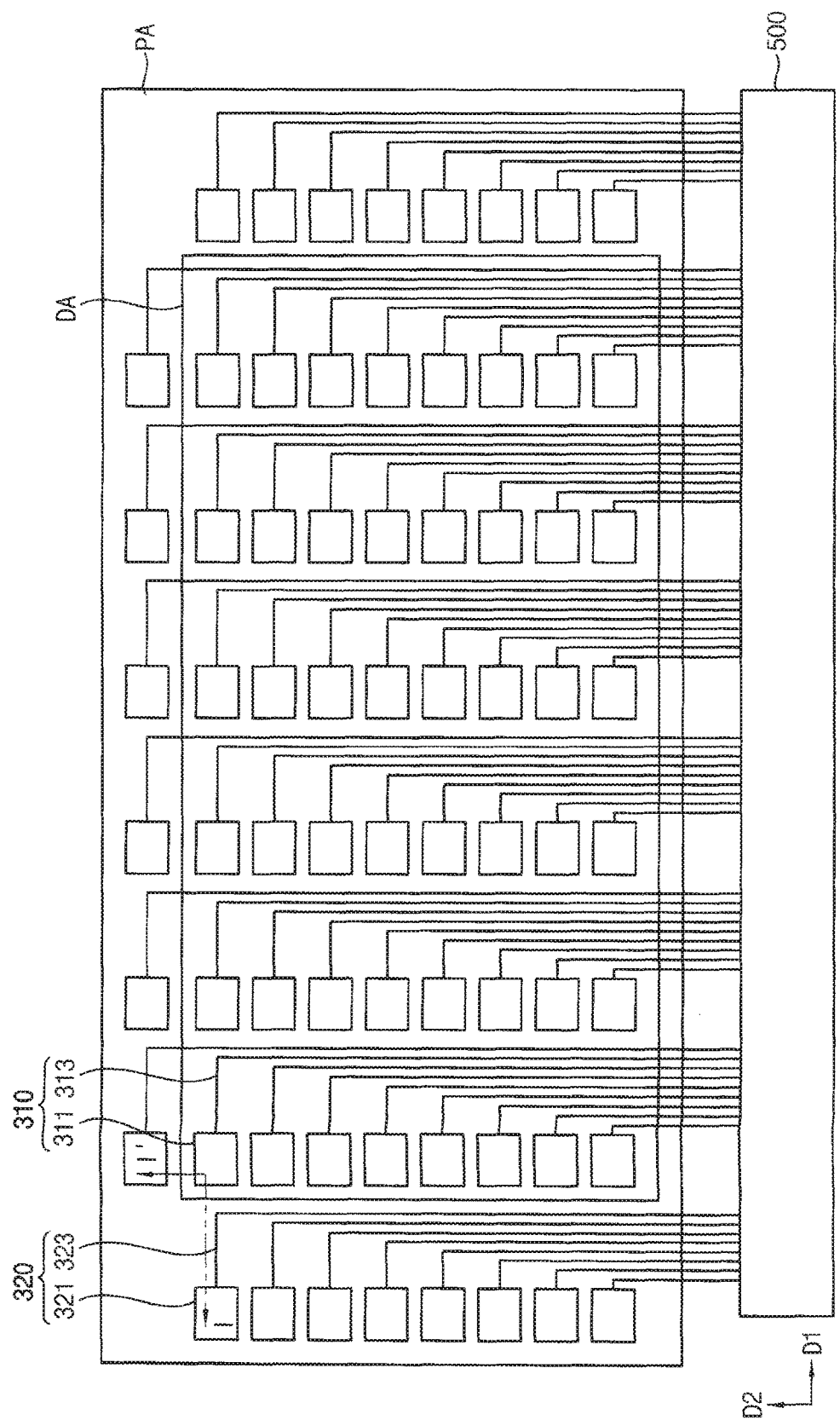
FIG. 1 is a plan view of a first embodiment of a touch display apparatus constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
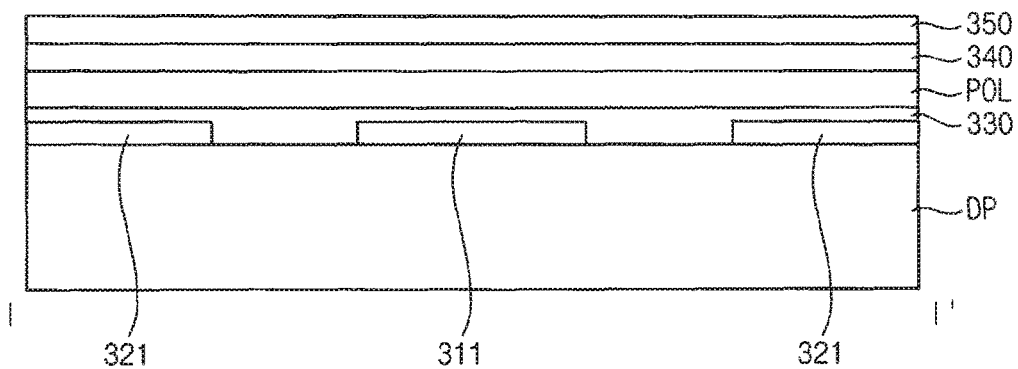
FIG. 2 is a cross-sectional side view of the touch display apparatus of FIG. 1 taken along line I-I' of FIG. 1.

Referring to FIGS. 1 and 2, a touch display apparatus according to exemplary embodiments includes a display panel DP, a touch electrode 310, a first pressure sensing electrode 320, a polarizer POL, a second pressure sensing electrode 340 and a sensing driver 500.

The display panel DP displays an image. The display panel DP includes a display region DA and a peripheral region PA surrounding the display region DA. For example, the display panel DP may be a liquid crystal display (LCD) panel, an organic light emitting display (OLED) panel, or the like. The display panel DP will be described in greater detail with reference to FIGS. 6 and 7.

The touch electrode 310 and the first pressure sensing electrode 320 are disposed on the display panel DP. The touch electrode 310 may include a plurality of touch patterns 311 and a plurality of touch connection wirings 313. The first pressure sensing electrode 320 may include a plurality of pressure sensing patterns 321 and a plurality of pressure sensing connection wirings 323.

The touch patterns 311 may include a transparent conductive material. For example, the touch patterns 311 may include indium tin oxide (ITO), indium zinc oxide (IZO), or the like. For another example, the touch patterns 311 may include titanium (Ti), molybdenum titanium (MoTi), or the like.

In some exemplary embodiments, the touch connection wirings 313 may include a material different from that of the touch patterns 311. For example, the touch connection wirings 313 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like. In other exemplary embodiments, the touch connection wirings 313 may include the same material as that of the touch patterns 311. For example, the touch connection wirings 313 may include a transparent conductive material, such as indium tin oxide (ITO), indium zinc oxide (IZO), or the like. For another example, the touch connection wirings 313 may include titanium (Ti), molybdenum titanium (MoTi), or the like.

In some exemplary embodiments, the touch connection wirings 313 may be disposed on the same layer as that on which the touch patterns 311 are disposed. However, the touch connection wirings 313 may be disposed on a layer different from that on which the touch patterns 311 are disposed.

The touch patterns 311 may be electrically connected to the touch connection wirings 313. For example, each of the touch patterns 311 may be electrically connected to a respective one of the touch connection wirings 313. The touch electrode 310 including the touch patterns 311 and the touch connection wirings 313 may be disposed on the display region DA and detect a touch position.

The touch patterns 311 and the touch connection wirings 313 may form a touch sensing unit that is included in the touch display apparatus according to exemplary embodiments. The touch sensing unit included in the touch display apparatus according to an exemplary embodiment may be implemented with a capacitive-type touch sensing unit. If the touch sensing unit is contacted by an object, such as a user's finger or stylus pen, a change in capacitance from a contact may be provided to the sensing driver 500 through the touch patterns 311 and the touch connection wirings 313. Then, the change in capacitance may be converted into an electrical signal by an X and Y input processing circuit or the like, so that the contact position (or the touch position) may be detected.

The pressure sensing patterns 321 may include a transparent conductive material. For example, the pressure sensing patterns 321 may include indium tin oxide (ITO), indium zinc oxide (IZO), or the like. For another example, the pressure sensing patterns 321 may include titanium (Ti), molybdenum titanium (MoTi), or the like.

In some exemplary embodiments, the pressure sensing connection wirings 323 may include a material different from that of the pressure sensing patterns 321. For example, the pressure sensing connection wirings 323 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like. In other exemplary embodiments, the pressure sensing connection wirings 323 may include the same material as that of the pressure sensing patterns 321. For example, the pressure sensing connection wirings 323 may include a transparent conductive material, such as indium tin oxide (ITO), indium zinc oxide (IZO), or the like. For another example, the pressure sensing connection wirings 323 may include titanium (Ti), molybdenum titanium (MoTi), or the like.

In some exemplary embodiments, the pressure sensing connection wirings 323 may be disposed on the same layer as that on which the pressure sensing patterns 321 are disposed. However, exemplary embodiments are not limited thereto, and the pressure sensing connection wirings 323 may be disposed on a layer different from that on which the pressure sensing patterns 321 are disposed.

The pressure sensing patterns 321 may be electrically connected to the pressure sensing connection wirings 323. For example, each of the pressure sensing patterns 321 may be electrically connected to a respective one of the pressure sensing connection wirings 323. The first pressure sensing electrode 320 including the pressure sensing patterns 321 and the pressure sensing connection wirings 323 and the second pressure sensing electrode 340 may detect a pressure. The first pressure sensing electrode 320 is disposed on the peripheral region PA.

The touch electrode 310 and the first pressure sensing electrode 320 may be disposed in the same layer, and are electrically connected to the sensing driver 500. The same signal that is generated by the sensing driver 500 may be applied to the touch electrode 310 and the first pressure sensing electrode 320. For example, a touch sensing signal may be applied to the touch electrode 310 and may also be applied to the first pressure sensing electrode 320.

A first insulation layer 330 may be disposed on the touch electrode 310 and the first pressure sensing electrode 320. The first insulation layer 330 may cover the touch electrode 310 and the first pressure sensing electrode 320. In other words, the touch electrode 310 and the first pressure sensing electrode 320 might not be exposed and may be insulated by the first insulation layer 330. The first insulation layer 330 may prevent the touch electrode 310 and the first pressure sensing electrode 320 from being damaged or corroded.

In some exemplary embodiments, the first insulation layer 330 may include an inorganic insulating material. For example, the first insulation layer 330 may include silicon oxide ($SiO_x$), silicon nitride ($SiN_x$), or the like. For example, the first insulation layer 330 may include silicon oxide ($SiO_x$) and may have a thickness of about 500 Å. In addition, the first insulation layer 330 may include a plurality of layers, each of which includes a material different from that of the other layers.

The polarizer POL may be disposed on the first insulation layer 330 (e.g., on the touch electrode 310 and the first pressure sensing electrode 320). The polarizer POL may include a linear polarization member and a phase retardation film disposed below the linear polarization member. The polarizer POL may include a base film including a dielectric elastomer material.

The base film including the dielectric elastomer material may include a material having restoring force and flexibility. In addition, the base film may include a dielectric material having predetermined permittivity for measuring a capacitance value. For example, the base film may include polyvinylidene fluoride (PVDF), polydimethyl siloxan (PDMS), polyvinylidene fluoride-co-trifluoroethylene (PVFT), or the like.

The linear polarization member may include a polarizer layer, and a lower supporter and an upper supporter that support the polarizer layer. For example, the polarizer layer may include poly vinylalcohol (PVA). The lower supporter and the upper supporter may include triacetyl cellulous (TAC).

The phase retardation film may be a λ/4 phase retardation film, and may convert a linear polarization into a circular polarization, or a circular polarization into a linear polarization. For example, the phase retardation film may include a birefringence film, an alignment film of a liquid crystal polymer, or a film supporting an alignment layer of the liquid crystal polymer, or the like, which may be formed by stretching a film made of a polymer, such as polycarbonate or polyvinyl alcohol, polystyrene or polymethyl methacrylate, polypropylene or other polyolefins, or polyacrylate or polyamide.

The polarizer POL may serve as a circular polarizer, because a linear polarization member, which linearly polarizes light in a set or predetermined direction, and a phase retardation film, which converts the linear polarization into the circular polarization, may be attached to each other.

The second pressure sensing electrode 340 may be disposed on the polarizer POL. In an example of FIGS. 1 and 2, the second pressure sensing electrode 340 may be disposed on the display region DA and the peripheral region PA of the display panel DP. In other words, the second pressure sensing electrode 340 may be formed on a whole of the display panel DP.

The second pressure sensing electrode 340 may overlap the first pressure sensing electrode 320. The first pressure sensing electrode 320, the polarizer POL and the second pressure sensing electrode 340 may sense change in capacitance based on change of a thickness of the polarizer POL. The change in capacitance based on the change of the thickness of the polarizer POL may be defined by the following Equation 1.

$$C = \varepsilon 0 * \varepsilon r * A/d \quad \text{[Equation 1]}$$

In Equation 1, "C" may denote capacitance, "A" may denote an area of the polarizer, "ε0" may denote absolute permittivity of free space, "εr" may denote relative permittivity of the dielectric elastomer material, and "d" may denote the thickness of the polarizer.

When pressure is not applied to the polarizer POL, the polarizer POL may have a first thickness. When pressure is applied to the polarizer POL, the polarizer POL may have a second thickness. When a thickness of the polarizer POL is changed from the first thickness to the second thickness, capacitance may be changed. Accordingly, the polarizer POL may sense pressure based on a change in the capacitance caused by the change of the thickness of the polarizer POL.

The second pressure sensing electrode 340 may include a transparent conductive material. For example, the second pressure sensing electrode 340 may include indium tin oxide (ITO), indium zinc oxide (IZO), or the like. For another example, the second pressure sensing electrode 340 may include titanium (Ti), molybdenum titanium (MoTi), or the like.

A second insulation layer 350 may be disposed on the second pressure sensing electrode 340. The second insulation layer 350 may cover the second pressure sensing electrode 340. In other words, the second pressure sensing electrode 340 might not be exposed and may be insulated by the second insulation layer 350. The second insulation layer 350 may prevent the second pressure sensing electrode 340 from being damaged or corroded.

In some exemplary embodiments, the second insulation layer 350 may include an inorganic insulating material. For example, the second insulation layer 350 may include silicon oxide ($SiO_x$), silicon nitride ($SiN_x$), or the like. For example, the second insulation layer 350 may include silicon oxide ($SiO_x$) and may have a thickness of about 500 Å. In addition, the second insulation layer 350 may include a plurality of layers, each of which includes a material different from that of the other layers.

Figure 3:
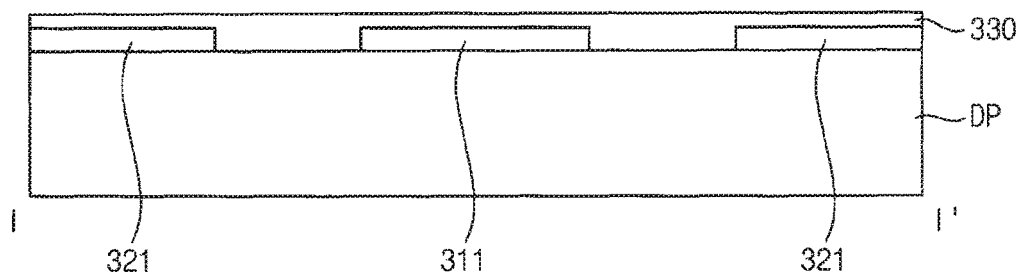
FIGS. 3, 4 and 5 are cross-sectional side views showing sequential steps of an exemplary method of manufacturing the touch display apparatus of FIG. 2.

Referring to FIG. 3, touch patterns 311 and pressure sensing patterns 321 may be formed on a display panel DP, and a first insulation layer 330 may be formed on the touch patterns 311 and the pressure sensing patterns 321.

The touch patterns 311 may include a transparent conductive material. For example, the touch patterns 311 may include indium tin oxide (ITO), indium zinc oxide (IZO), or the like. For another example, the touch patterns 311 may include titanium (Ti), molybdenum titanium (MoTi), or the like.

The pressure sensing patterns 321 may include a transparent conductive material. For example, the pressure sensing patterns 321 may include indium tin oxide (ITO), indium zinc oxide (IZO), or the like. For another example, the pressure sensing patterns 321 may include titanium (Ti), molybdenum titanium (MoTi), or the like.

In some exemplary embodiments, the pressure sensing patterns 321 may include the same material as that of the touch patterns 311. However, exemplary embodiments are not limited thereto, and the pressure sensing patterns 321 may include a material different from that of the touch patterns 311.

Although not illustrated in FIG. 3, touch connection wirings 313 connected to the touch patterns 311 and pressure sensing connection wirings 323 connected to the pressure sensing patterns 321 may also be formed on the display panel DP. The touch patterns 311 and the touch connection wirings 313 may form a touch electrode 310, and the pressure sensing patterns 321 and the pressure sensing connection wirings 323 may form a first pressure sensing electrode 320.

The first insulation layer 330 may cover the touch electrode 310 and the first pressure sensing electrode 320. In other words, the touch electrode 310 and the first pressure sensing electrode 320 might not be exposed and may be insulated by the first insulation layer 330. The first insulation layer 330 may prevent the touch electrode 310 and the first pressure sensing electrode 320 from being damaged or corroded.

In some exemplary embodiments, the first insulation layer 330 may include an inorganic insulating material. For example, the first insulation layer 330 may include silicon oxide ($SiO_x$), silicon nitride ($SiN_x$), or the like. For example, the first insulation layer 330 may include silicon oxide ($SiO_x$) and may have a thickness of about 500 Å. In addition, the first insulation layer 330 may include a plurality of layers, each of which includes a material different from that of the other layers.

Figure 4:
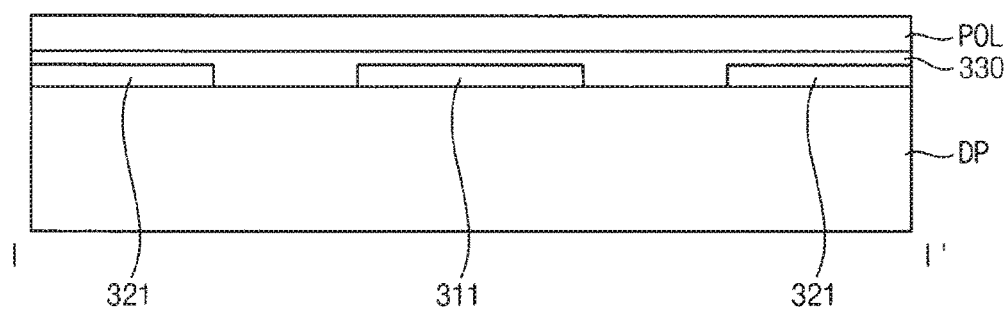

Referring to FIG. 4, a polarizer POL may be formed on the first insulation layer 330 (e.g., on the touch electrode 310 and the first pressure sensing electrode 320).

The polarizer POL may include a linear polarization member and a phase retardation film disposed below the linear polarization member. The polarizer POL may include a base film including a dielectric elastomer material.

The base film including the dielectric elastomer material may include a material having restoring force and flexibility. In addition, the base film may include a dielectric material having predetermined permittivity for measuring a capacitance value. For example, the base film may include polyvinylidene fluoride (PVDF), polydimethyl siloxan (PDMS), polyvinylidene fluoride-co-trifluoroethylene (PVFT), or the like.

Figure 5:
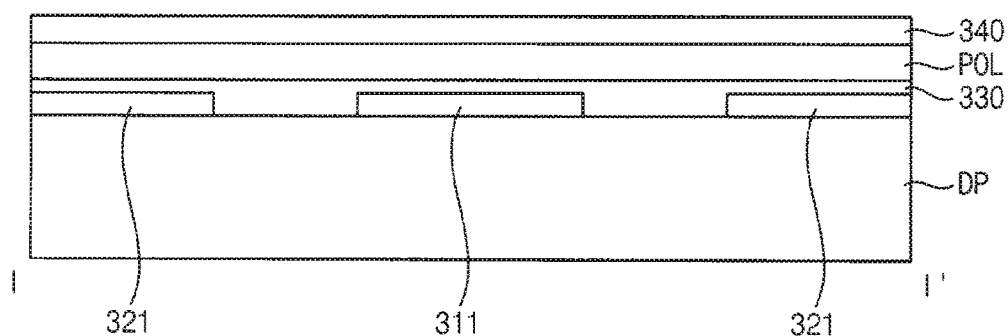

Referring to FIG. 5, a second pressure sensing electrode 340 may be formed on the polarizer POL.

The second pressure sensing electrode 340 may overlap the first pressure sensing electrode 320. The first pressure sensing electrode 320, the polarizer POL and the second pressure sensing electrode 340 may sense change in capacitance based on change of a thickness of the polarizer POL.

The second pressure sensing electrode 340 may include a transparent conductive material. For example, the second pressure sensing electrode 340 may include indium tin oxide (ITO), indium zinc oxide (IZO), or the like. For another example, the second pressure sensing electrode 340 may include titanium (Ti), molybdenum titanium (MoTi), or the like.

Referring to FIG. 2, a second insulation layer 350 may be formed on the second pressure sensing electrode 340.

The second insulation layer 350 may cover the second pressure sensing electrode 340. In other words, the second pressure sensing electrode 340 might not be exposed and may be insulated by the second insulation layer 350. The second insulation layer 350 may prevent the second pressure sensing electrode 340 from being damaged or corroded.

In some exemplary embodiments, the second insulation layer 350 may include an inorganic insulating material. For example, the second insulation layer 350 may include silicon oxide ($SiO_x$), silicon nitride ($SiN_x$), or the like. For example, the second insulation layer 350 may include silicon oxide ($SiO_x$) and may have a thickness of about 500 Å. In addition, the second insulation layer 350 may include a plurality of layers, each of which includes a material different from that of the other layers.

Figure 6:
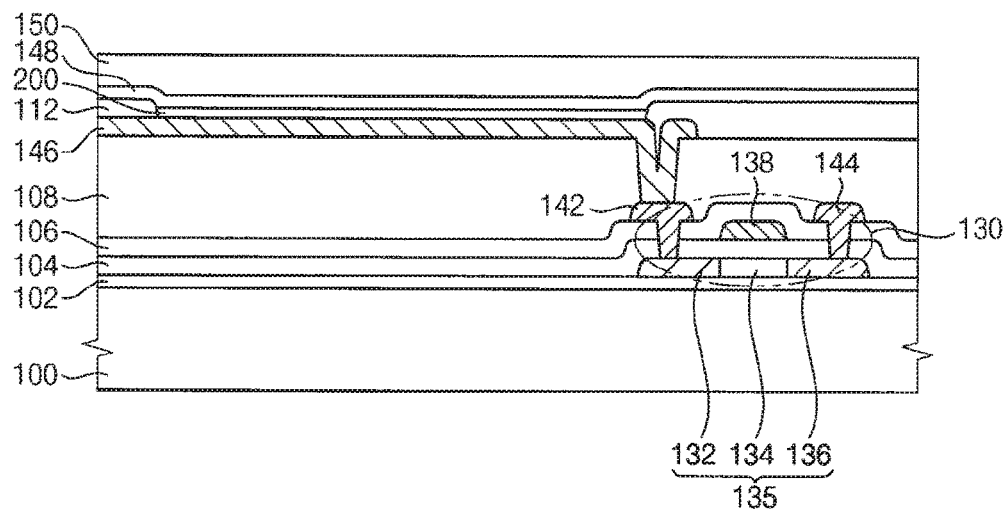
FIG. 6 is a cross-sectional side view of a first embodiment of a display panel included in the touch display apparatus of FIG. 2.

Referring to FIG. 6, a display panel DP according to exemplary embodiments may be implemented with an OLED panel.

The display panel DP of FIG. 6 may include a lower substrate 100, a buffer layer 102, a gate insulation layer 104, an insulation interlayer 106, a planarizing layer 108, a pixel defining layer 112, a thin-film transistor (TFT) 130, a first electrode 146, a second electrode 148, an organic light emitting element 200, and a protecting layer 150.

The lower substrate 100 may include a transparent insulation substrate. For example, the lower substrate 100 may include a glass substrate, a quartz substrate, a transparent resin substrate including a transparent resin, etc. Examples of the transparent resin that may be used for the lower substrate 100 may include a polyimide resin, an acrylic resin, a polyacrylate resin, a polycarbonate resin, a polyether resin, a polyethylene terephthalate resin, and a sulfonic acid based resin, etc.

The buffer layer 102 may be disposed on the lower substrate 100, and may include an insulating material. Examples of the insulating material that may be used for the buffer layer 102 may include an inorganic insulating material, such as silicon oxide (SiOx), silicon nitride (SiNx), silicon oxynitride (SiOxNy), silicon carbide (SiOxCy), silicon carbon-nitride (SiCxNy), etc. The inorganic insulating material may be used alone, in a combination thereof, in a mixture thereof, or in a stacked structure thereof. When the buffer layer 102 includes the stacked structure, the buffer layer 102 may have a multi-layered structure including a silicon oxide layer, a silicon nitride layer, a silicon oxynitride layer, a silicon carbide layer and/or a silicon carbon-nitride layer.

The buffer layer 102 may prevent diffusion of metal atoms or impurities from the lower substrate 100, to control speed of heat transfer during subsequent crystallization process for an active pattern 135. Thus, electric characteristics of the active pattern 135 may thereby be improved. Also, the buffer layer 102 planarizes a surface of the lower substrate 100.

The active pattern 135 may be disposed on the buffer layer 102. For example, the active pattern 135 may include polysilicon. The active pattern 135 may include a drain contact portion 132, a source contact portion 136, and a channel portion 134. The drain contact portion 132 may make contact with a drain electrode 142 of a thin-film transistor 130. The source contact portion 136 may make contact with a source electrode 144 of the thin-film transistor 130. The channel portion 134 may be interposed between the drain contact portion 132 and the source contact portion 136.

The gate insulation layer 104 may be disposed on the buffer layer 102, on which the active pattern 135 is formed, to electrically insulate the active pattern 135 from the gate electrode 138 and a gate line. The gate insulation layer 104 may include silicon nitride, metal oxide, etc. Examples of an insulating material that may be used for the gate insulation layer 104 may include hafnium oxide (HfOx), aluminum oxide (AlOx), zirconium oxide (ZrOx), titanium oxide (TiOx), and tantalum oxide (TaOx), etc. These materials may be used alone, in a combination thereof, in a mixture thereof, or in a stacked structure thereof. The gate insulation layer 104 may include contact holes, through which the source contact portion 136 and the drain contact portion 132 may be exposed.

The gate electrode 138 may be disposed on the gate insulation layer 104. The gate electrode 138 may be disposed on the channel portion 134 of the active pattern 135. When a voltage difference is formed between the gate electrode 138 and the source electrode 144, the thin-film transistor 130 may be turned on, so that a current may flow through the channel portion 134 toward the drain electrode 142.

The gate electrode 138 may include a conductive material, such as a metal, an alloy, a metal nitride, a conductive metal oxide, and a transparent conductive material, etc. Examples of the conductive material that may be used for the gate electrode 138 may include aluminum (Al), aluminum alloy, aluminum nitride (AlNx), silver (Ag), silver alloy, tungsten (W), tungsten nitride (WNx), copper (Cu), copper alloy, nickel (Ni), chromium (Cr), chromium nitride (CrNx), molybdenum (Mo), molybdenum alloy, titanium (Ti), titanium nitride (TiNx), platinum (Pt), tantalum (Ta), tantalum nitride (TaNx), neodymium (Nd), scandium (Sc), strontium ruthenium oxide (SRO), zinc oxide (ZnOx), indium tin oxide (ITO), tin oxide (SnOx), indium oxide (InOx), gallium oxide (GaOx), and indium zinc oxide (IZO), etc. These materials may be used alone or in a combination thereof. Also, the gate electrode 138 may have a monolayered structure or a multi-layered structure including a metal layer, an alloy layer, a metal nitride layer, a conductive metal oxide layer, and/or a transparent conductive material layer.

The insulation interlayer 106 may be formed on the gate insulation layer 104, on which the gate electrode 138 and the gate line may be formed. The insulation interlayer 106 may insulate the gate electrode 138 and the gate line from the source electrode 144 and the drain electrode 142.

The insulation interlayer 106 may include silicon compound. Examples of an insulating material that may be used for the insulation interlayer 106 may include silicon oxide, silicon nitride, silicon oxynitride, silicon carbon-nitride, silicon carbide, etc. These materials may be used alone of in a combination thereof. The insulation interlayer 106 may have contact holes, through which the source contact portion 136 and the drain contact portion 132 of the active pattern 135 may be exposed.

The source electrode 144 and the drain electrode 142 may be formed on the insulation interlayer 106. The source electrode 144 and the drain electrode 142 may make contact with the source contact portion 136 and the drain contact portion 132 of the active pattern 135, respectively.

The source and drain electrodes 144 and 142 may include a conductive material, such as metal, alloy, metal nitride, conductive metal oxide, transparent conductive material, etc. Examples of the conductive material that may be used for the source and drain electrodes 144 and 142 may include aluminum (Al), aluminum alloy, aluminum nitride (AlNx), silver (Ag), silver alloy, tungsten (W), tungsten nitride (WNx), copper (Cu), copper alloy, nickel (Ni), chromium (Cr), chromium nitride (CrNx), molybdenum (Mo), molybdenum alloy, titanium (Ti), titanium nitride (TiNx), platinum (Pt), tantalum (Ta), tantalum nitride (TaNx), neodymium (Nd), scandium (Sc), strontium ruthenium oxide (SRO), zinc oxide (ZnOx), indium tin oxide (ITO), tin oxide (SnOx), indium oxide (InOx), gallium oxide (GaOx), and indium zinc oxide (IZO), etc. These materials may be used alone or in a combination thereof. Also, the source and drain electrodes 144 and 142 may have a mono-layered structure or a multi-layered structure including a metal layer, an alloy layer, a metal nitride layer, a conductive metal oxide layer, and/or a transparent conductive material layer.

The planarizing layer 108 may be formed on the insulation interlayer 106, on which the source and drain electrodes 144 and 142 and a data line may be disposed, to electrically insulate the source electrode 144 from the first electrode 146. The planarizing layer 108 may include an organic insulating material or an inorganic insulating material. Examples of the insulating material that may be used for the planarizing layer 108 may include a photoresist, an acrylic resin, a polyimide resin, a polyamide resin, a siloxane resin, a photoresist acryl carboxyl resin, a novolak resin, an alkaline solable resin, silicon compound, silicon nitride, silicon oxynitride, silicon carbon-oxide, and silicon carbon-nitride, etc. These materials may be used alone or in a combination thereof.

The planarizing layer 108 may have a contact hole through which the drain electrode 142 is exposed. The first electrode 146 may be disposed on the planarizing layer 108 corresponding to the pixel region, and may be electrically connected to the drain electrode 142 through the contact hole of the planarizing layer 108.

When the display panel DP is a front illumination type, the first electrode 146 may include a reflective metal, a reflective alloy, etc. For example, the first electrode 146 may include silver, platinum, gold, chromium, tungsten, molybdenum, titanium, palladium, iridium, and an alloy thereof, etc. These materials may be used alone or in a combination thereof. Alternatively, the first electrode 146 may include a transparent conductive material, such as indium tin oxide, tin oxide, indium zinc oxide, zinc oxide, indium gallium oxide, and gallium oxide, etc. These materials may be used alone or in a combination thereof.

The pixel defining layer 112 may be disposed on the planarizing layer 108, on which the first electrode 146 is formed, to expose a portion of the first electrode 146. The pixel defining layer 112 may include organic material or inorganic material. Examples of the material that may be used for the pixel defining layer 112 may include photoresist, a poly acrylic resin, a polyimide resin, an acrylic resin, and a silicon compound, etc. A display region and a non-display region may be defined on the OLED panel by the exposed portion of the first electrode 146 that is exposed by the pixel defining layer 112. For example, the exposed portion of the first electrode 146, which is exposed by the pixel defining layer 112, may correspond to the display region. A remaining portion of the pixel defining layer 112 may define the non-display region.

The organic light emitting element 200 may be disposed on the first electrode 146 that is exposed by the pixel defining layer 112. The second electrode 148 may cover the organic light emitting element 200 and the pixel defining layer 112.

When the display panel DP is the front illumination type, the second electrode 148 may include a transparent conductive material. Examples of the transparent conductive material that may be used for the second electrode 148 include indium tin oxide, tin oxide, indium zinc oxide, zinc oxide, indium gallium oxide, and gallium oxide, etc. These materials may be used alone or in a combination thereof.

Figure 7:
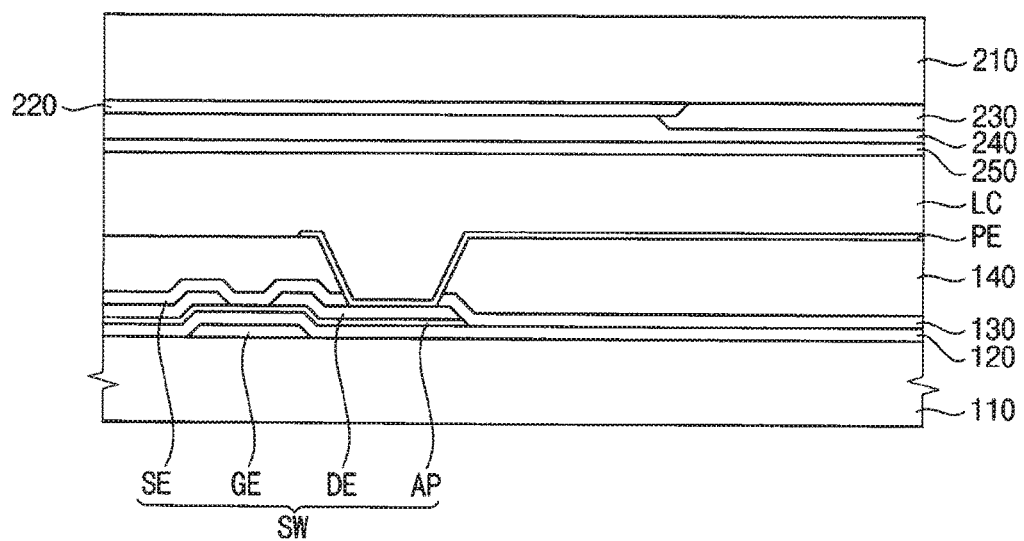
FIG. 7 is a cross-sectional side view of a second embodiment of a display panel included in the touch display apparatus of FIG. 2.

Referring to FIG. 7, a display panel DP according to exemplary embodiments may be implemented with an LCD panel.

The display panel DP of FIG. 7 may include a lower substrate 110, a gate electrode GE, a source electrode SE, a drain electrode DE, an active pattern AP, a pixel electrode PE, a first insulation layer 120, a second insulation layer 130, an organic layer 140, a liquid crystal layer LC, an upper substrate 210, a black matrix 220, a color filter 230, an over-coating layer 240, and a common electrode 250. Examples of the lower substrate 110 may include a glass substrate, a quartz substrate, a silicon substrate, a plastic substrate, and the like.

The gate electrode GE may be disposed on the lower substrate 110. The gate electrode GE may be electrically connected with a gate line. The gate electrode GE may have a single layer structure including copper (Cu), silver (Ag), chrome (Cr), molybdenum (Mo), aluminum (Al), titanium (Ti), manganese (Mn), or a mixture thereof. In addition, the gate electrode GE may have a multi-layer structure having multiple layers including materials different from each other. For example, the gate electrode GE may include a copper layer and a titanium layer disposed on and/or under the copper layer.

The first insulation layer 120 may be formed on the gate electrode GE. The first insulation layer 120 may cover the lower substrate 110 and a first conductive pattern including the gate electrode GE. The first insulation layer 120 may include an inorganic insulating material, such as silicon oxide (SiOx) and/or silicon nitride (SiNx). For example, the first insulation layer 120 may include silicon oxide (SiOx), and may have a thickness of about 500 Å. In addition, the first insulation layer 120 may include multiple layers including different materials from each other.

An active pattern AP may be formed on the first insulation layer 120. The active pattern AP may be formed on the first insulation layer 120 in an area, in which the gate electrode GE is formed. The active pattern AP may be overlapped with the gate electrode GE. The active pattern AP may be partially overlapped with the source electrode SE and the drain electrode DE. The active pattern AP may be disposed between the gate electrode GE and the source electrode SE. The active pattern AP may be disposed between the gate electrode GE and the drain electrode DE.

The source electrode SE and the drain electrode DE may be formed on the active pattern AP. The source electrode SE and the drain electrode DE may be spaced apart from each other. The source electrode SE and the drain electrode DE may be formed in the same layer as a data line.

The source electrode SE and the drain electrode DE may have a single layer structure including copper (Cu), silver (Ag), chrome (Cr), molybdenum (Mo), aluminum (Al), titanium (Ti), manganese (Mn), and a mixture thereof. In addition, the source electrode SE and the drain electrode DE may have a multi-layer structure having multiple layers including materials different from each other. For example, the source electrode SE and the drain electrode DE may include a copper layer and a titanium layer disposed on and/or under the copper layer.

The second insulation layer 130 may be formed on the source electrode SE and the drain electrode DE. The second insulation layer 130 may be formed with a material including silicon oxide (SiOx) or silicon nitride (SiNx).

The organic layer 140 may be disposed on the second insulation layer 130. The organic layer 140 may planarize an upper surface of the substrate, so that defects due to the stepped structure, such as disconnection of a signal line, may be prevented. The organic layer 140 may be an insulation layer including an organic material. The organic layer 140 may be a color filter.

The pixel electrode PE may be formed on the organic layer 140. The pixel electrode PE may be electrically connected with the drain electrode DE through a first contact hole. The pixel electrode PE may include a transparent conductive material, such as indium tin oxide (ITO) and indium zinc oxide (IZO). In addition, the pixel electrode PE may include titanium (Ti) and/or molybdenum titanium (MoTi).

The upper substrate 210 may include a glass substrate, a quartz substrate, a silicon substrate, a plastic substrate and the like.

The black matrix 220 may be disposed on the upper substrate 210, to correspond to a gate line, a data line, a gate electrode GE, a source electrode SE, and a drain electrode DE. The black matrix 220 may block light and may be disposed to correspond to a non-display area, on which an image is not displayed.

The color filter 230 may be disposed on upper substrate 210, on which the black matrix 220 is disposed. The color filter 230 may supply colors to light passing through the liquid crystal layer LC. The color filter 230 may include a red color filter, a green color filter, and blue color filter. The color filter 230 may correspond to a unit pixel. The color filters adjacent to each other may have different colors. The color filter 230 may be overlapped with adjacent color filter 230 in a boundary of the adjacent unit pixels. In addition, the color filter 230 may be spaced apart from an adjacent color filter 230 in the boundary of the adjacent unit pixels.

The over-coating layer 240 may be disposed on the color filter 230 and the black matrix 220. The over-coating layer 240 may flatten the color filter 230, may protect the color filter 230, and may insulate the color filter 230. The over-coating layer 240 may include acrylic-epoxy material.

The common electrode 250 may be disposed on the over-coating layer 240. The liquid crystal layer LC may be disposed between the lower substrate 110 and the upper substrate 210. The liquid crystal layer LC may include liquid crystal molecules having optical anisotropy. The liquid crystal molecules may be driven by an electric field, so that an image is displayed by passing or blocking light through the liquid crystal layer LC. In addition, the display panel DP of FIG. 7 may further include a backlight assembly providing light to the display panel DP.

Figure 8:
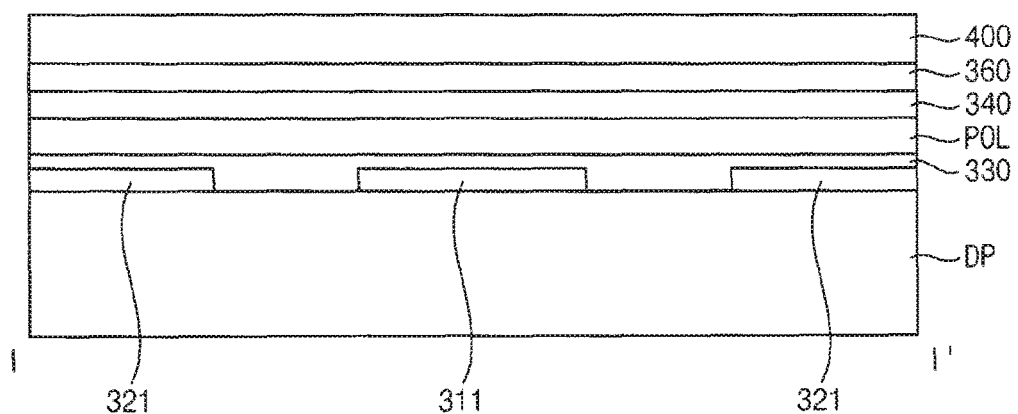
FIG. 8 is a cross-sectional side view of a second embodiment of a touch display apparatus constructed according to the principles of the invention.

FIG. 8 illustrates another example of the touch display apparatus taken along line I-I' of FIG. 1.

A touch display apparatus of FIG. 8 may be substantially the same as the touch display apparatus of FIG. 2, except that the touch display apparatus of FIG. 8 further includes a transparent adhesive layer 360 and a window member 400. Like reference numerals refer to like elements, and repeated explanations are omitted.

Referring to FIG. 8, the transparent adhesive layer 360 may be disposed on the second pressure sensing electrode 340. For example, the transparent adhesive layer 360 may include an optically clear adhesive (OCA), an optically clear resin (OCR), or the like. The transparent adhesive layer 360 may attach the second pressure sensing electrode 340 with the window member 400.

The window member 400 may be disposed on the transparent adhesive layer 360. The window member 400 may protect the display panel DP. For example, the window member 400 may include a transparent material. The window member 400 may include a plurality of base layers. An adhesive layer may be disposed between two adjacent base layers for attaching the two adjacent base layers.

Figure 9:
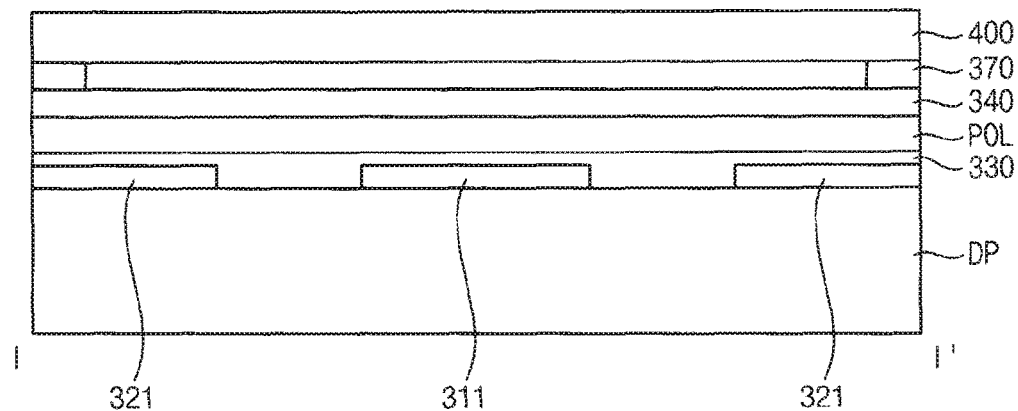
FIG. 9 is a cross-sectional side view of a third embodiment of a touch display apparatus constructed according to the principles of the invention.

FIG. 9 illustrates still another example of the touch display apparatus taken along line I-I' of FIG. 1.

A touch display apparatus of FIG. 9 may be substantially the same as the touch display apparatus of FIG. 2, except that the touch display apparatus of FIG. 9 further includes an adhesive member 370 and a window member 400. Like reference numerals refer to like elements, and repeated explanations are omitted.

Referring to FIG. 9, the adhesive member 370 may be disposed on the second pressure sensing electrode 340. The adhesive member 370 may be disposed only on the peripheral region PA of the display panel DP, and thus an air gap may be formed between the second pressure sensing electrode 340 and the window member 400.

The window member 400 may be disposed on the adhesive member 370. The window member 400 may protect the display panel DP. For example, the window member 400 may include a transparent material. The window member 400 may include a plurality of base layers. An adhesive layer may be disposed between two adjacent base layers for attaching the two adjacent base layers.

Figure 10:
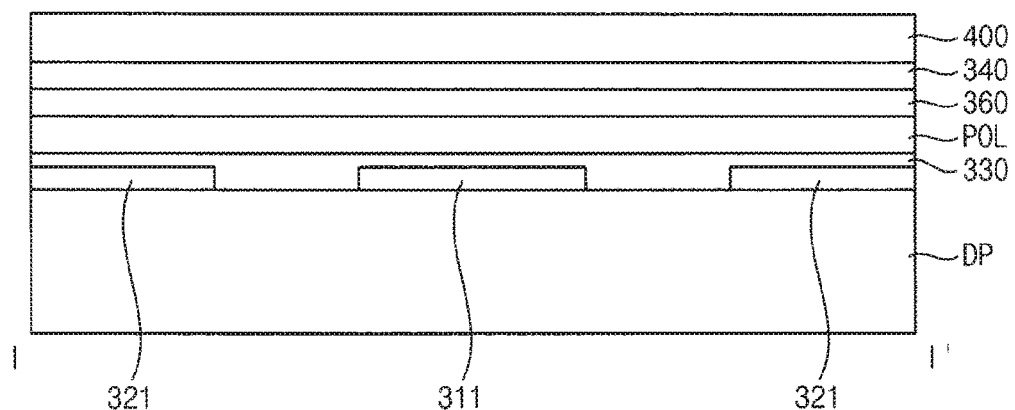
FIG. 10 is a cross-sectional side view of a fourth embodiment of a touch display apparatus constructed according to the principles of the invention.

FIG. 10 illustrates still another example of the touch display apparatus taken along line I-I' of FIG. 1.

A touch display apparatus of FIG. 10 may be substantially the same as the touch display apparatus of FIG. 2, except that the touch display apparatus of FIG. 10 further includes a transparent adhesive layer 360 and a window member 400. Like reference numerals refer to like elements, and repeated explanations are omitted.

Referring to FIG. 10, the transparent adhesive layer 360 may be disposed on the polarizer POL. For example, the transparent adhesive layer 360 may include an optically clear adhesive (OCA), an optically clear resin (OCR), or the like. The transparent adhesive layer 360 may attach the second pressure sensing electrode 340 to the polarizer POL.

The second pressure sensing electrode 340 may be disposed on the transparent adhesive layer 360, and the window member 400 may be disposed on the second pressure sensing electrode 340. The window member 400 may protect the display panel DP. For example, the window member 400 may include a transparent material. The window member 400 may include a plurality of base layers. An adhesive layer may be disposed between two adjacent base layers for attaching the two adjacent base layers.

Figure 11:
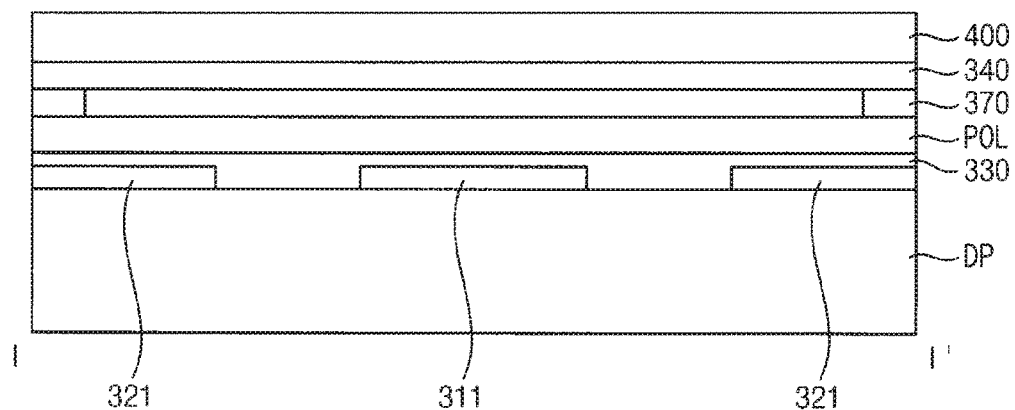
FIG. 11 is a cross-sectional side view of a fifth embodiment of a touch display apparatus constructed according to the principles of the invention.

FIG. 11 illustrates still another example of the touch display apparatus taken along line I-I' of FIG. 1.

A touch display apparatus of FIG. 11 may be substantially the same as the touch display apparatus of FIG. 2, except that the touch display apparatus of FIG. 11 further includes an adhesive member 370 and a window member 400. Like reference numerals refer to like elements, and repeated explanations are omitted.

Referring to FIG. 11, the adhesive member 370 may be disposed on the polarizer POL. The adhesive member 370 may be disposed only on the peripheral region PA of the display panel DP, and thus an air gap may be formed between the second pressure sensing electrode 340 and the polarizer POL.

The second pressure sensing electrode 340 may be disposed on the adhesive member 370, and the window member 400 may be disposed on the second pressure sensing electrode 340. The window member 400 may protect the display panel DP. For example, the window member 400 may include a transparent material. The window member 400 may include a plurality of base layers. An adhesive layer may be disposed between two adjacent base layers for attaching the two adjacent base layers.

Figure 12:
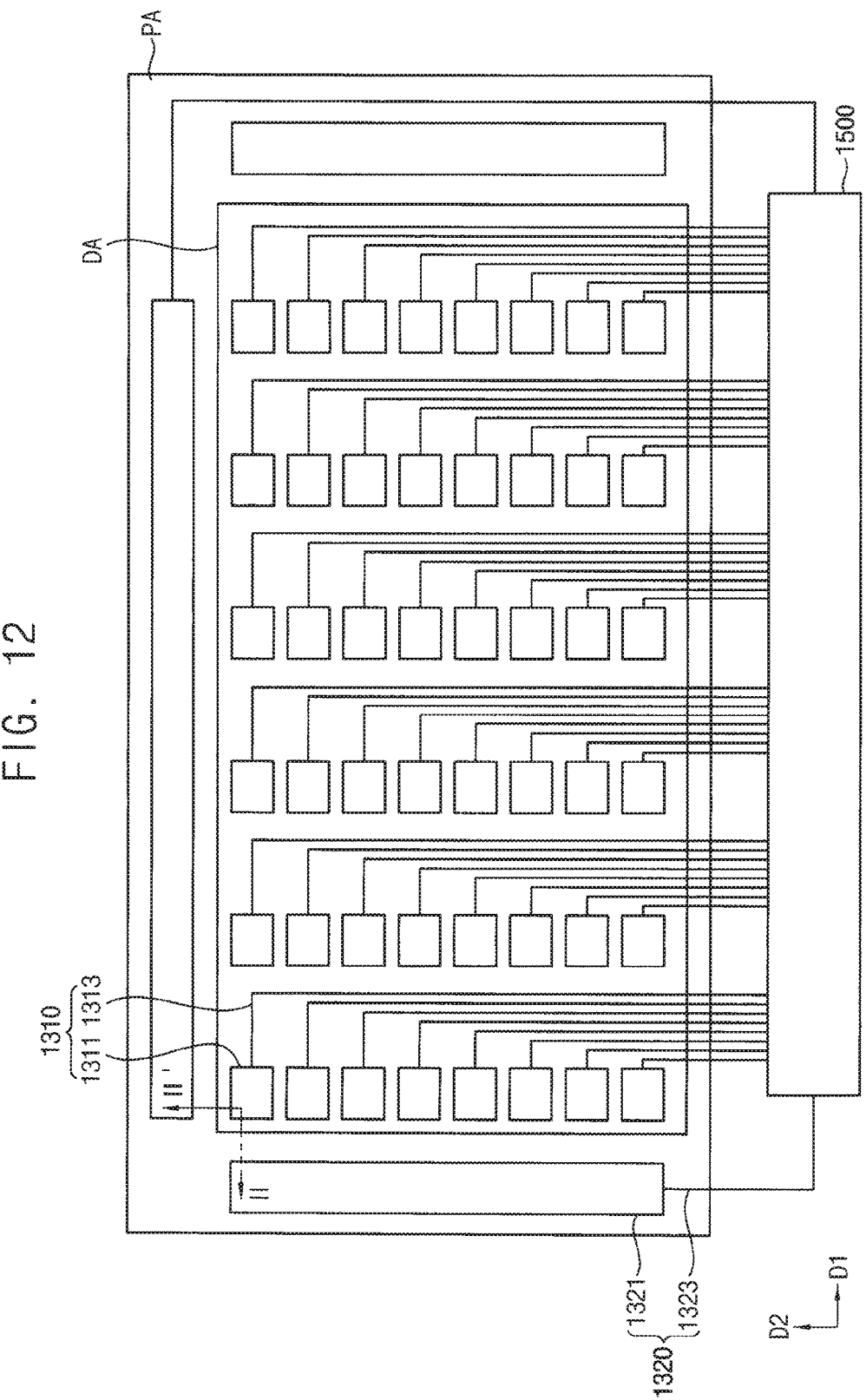
FIG. 12 is a plan view of a sixth embodiment of a touch display apparatus constructed according to the principles of the invention.
Figure 13:
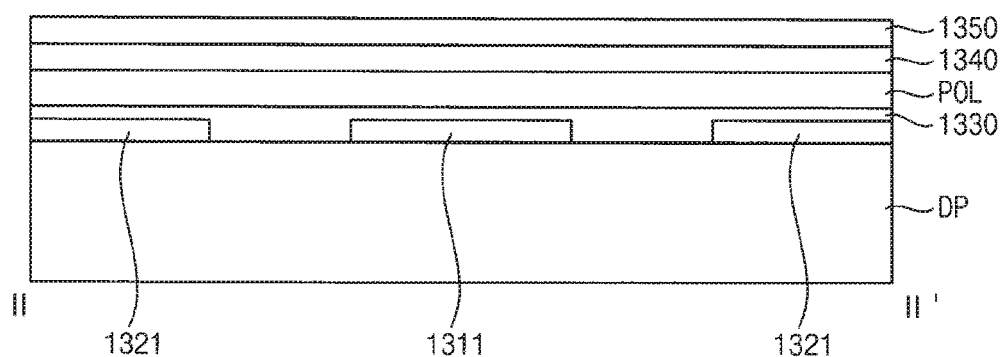
FIG. 13 is a cross-sectional side view of the touch display apparatus of FIG. 12 taken along line II-II' of FIG. 12.

A touch display apparatus of FIGS. 12 and 13 may be substantially the same as the touch display apparatus of FIGS. 1 and 2, except that a configuration of a first pressure sensing electrode 1320 may be changed in the touch display apparatus of FIGS. 12 and 13. Like reference numerals refer to like elements, and repeated explanations are omitted.

Referring to FIGS. 12 and 13, a touch display apparatus according to exemplary embodiments includes a display panel DP, a touch electrode 1310, the first pressure sensing electrode 1320, a polarizer POL, a second pressure sensing electrode 1340 and a sensing driver 1500.

The first pressure sensing electrode 1320 may include a plurality of pressure sensing patterns 1321 and a plurality of pressure sensing connection wirings 1323. In the example of FIGS. 12 and 13, each of the pressure sensing patterns 1321 adjacent to one side of the display panel DP may be implemented with a single pattern. The pressure sensing patterns 1321 may be electrically connected to the pressure sensing connection wirings 1323.

The pressure sensing patterns 1321 may include a transparent conductive material. For example, the pressure sensing patterns 1321 may include indium tin oxide (ITO), indium zinc oxide (IZO), or the like. For another example, the pressure sensing patterns 1321 may include titanium (Ti), molybdenum titanium (MoTi), or the like.

In some exemplary embodiments, the pressure sensing connection wirings 1323 may include a material different from that of the pressure sensing patterns 1321. For example, the pressure sensing connection wirings 1323 may include a relatively low-resistance metallic material, such as molybdenum (Mo), silver (Ag), titanium (Ti), copper (Cu), aluminum (Al), molybdenum/aluminum/molybdenum (Mo/Al/Mo), or the like. In other exemplary embodiments, the pressure sensing connection wirings 1323 may include the same material as that of the pressure sensing patterns 1321. For example, the pressure sensing connection wirings 1323 may include a transparent conductive material, such as indium tin oxide (ITO), indium zinc oxide (IZO), or the like. For another example, the pressure sensing connection wirings 1323 may include titanium (Ti), molybdenum titanium (MoTi), or the like.

In some exemplary embodiments, the pressure sensing connection wirings 1323 may be disposed on the same layer as the pressure sensing patterns 1321. However, exemplary embodiments are not limited thereto, and the pressure sensing connection wirings 1323 may be disposed on a layer different from the pressure sensing patterns 1321.

Figure 14:
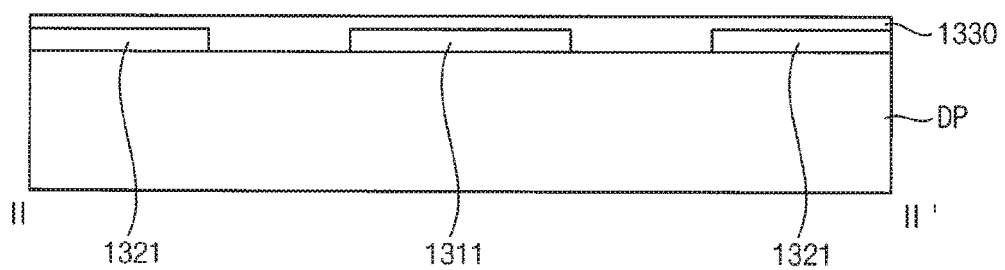
FIGS. 14, 15 and 16 are cross-sectional side views showing sequential steps of an exemplary method of manufacturing the touch display apparatus of FIG. 13.

Referring to FIG. 14, touch patterns 1311 and pressure sensing patterns 1321 may be formed on a display panel DP, and a first insulation layer 1330 may be formed on the touch patterns 1311 and the pressure sensing patterns 1321.

The touch patterns 1311 may include a transparent conductive material. For example, the touch patterns 1311 may include indium tin oxide (ITO), indium zinc oxide (IZO), or the like. For another example, the touch patterns 1311 may include titanium (Ti), molybdenum titanium (MoTi), or the like.

The pressure sensing patterns 1321 may include a transparent conductive material. For example, the pressure sensing patterns 1321 may include indium tin oxide (ITO), indium zinc oxide (IZO), or the like. For another example, the pressure sensing patterns 1321 may include titanium (Ti), molybdenum titanium (MoTi), or the like.

In some exemplary embodiments, the pressure sensing patterns 1321 may include the same material as that of the touch patterns 1311. However, exemplary embodiments are not limited thereto, and the pressure sensing patterns 1321 may include a material different from that of the touch patterns 1311.

Touch connection wirings 1313 connected to the touch patterns 1311 and pressure sensing connection wirings 1323 connected to the pressure sensing patterns 1321 may also be formed on the display panel DP. The touch patterns 1311 and the touch connection wirings 1313 may form a touch electrode 1310, and the pressure sensing patterns 1321 and the pressure sensing connection wirings 1323 may form a first pressure sensing electrode 1320.

The first insulation layer 1330 may cover the touch electrode 1310 and the first pressure sensing electrode 1320. In other words, the touch electrode 1310 and the first pressure sensing electrode 1320 might not be exposed and may be insulated by the first insulation layer 1330. The first insulation layer 1330 may prevent the touch electrode 1310 and the first pressure sensing electrode 1320 from being damaged or corroded.

In some exemplary embodiments, the first insulation layer 1330 may include an inorganic insulating material. For example, the first insulation layer 1330 may include silicon oxide ($SiO_x$), silicon nitride ($SiN_x$), or the like. For example, the first insulation layer 1330 may include silicon oxide ($SiO_x$) and may have a thickness of about 500 Å. In addition, the first insulation layer 1330 may include a plurality of layers, each of which includes a material different from that of the other layers.

Figure 15:
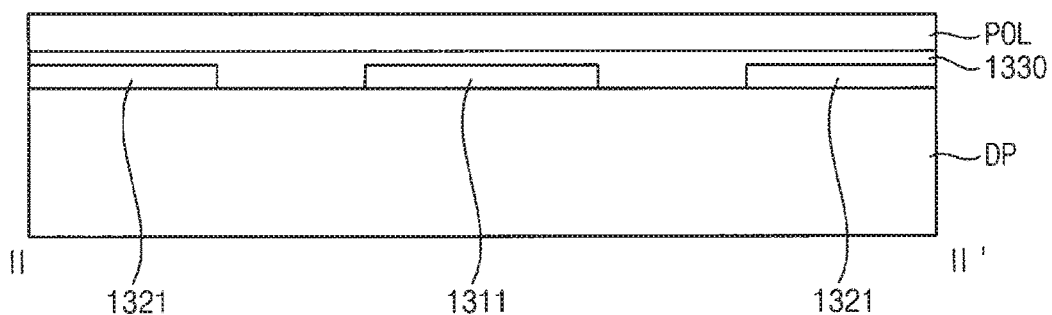

Referring to FIG. 15, a polarizer POL may be formed on the first insulation layer 1330 (e.g., on the touch electrode 1310 and the first pressure sensing electrode 1320).

The polarizer POL may include a linear polarization member and a phase retardation film disposed below the linear polarization member. The polarizer POL may include a base film including a dielectric elastomer material.

The base film including the dielectric elastomer material may include a material having a restoring force and flexibility. In addition, the base film may include a dielectric material having predetermined permittivity for measuring a capacitance value. For example, the base film may include polyvinylidene fluoride (PVDF), polydimethyl siloxan (PDMS), polyvinylidene fluoride-co-trifluoroethylene (PVFT), or the like.

Figure 16:
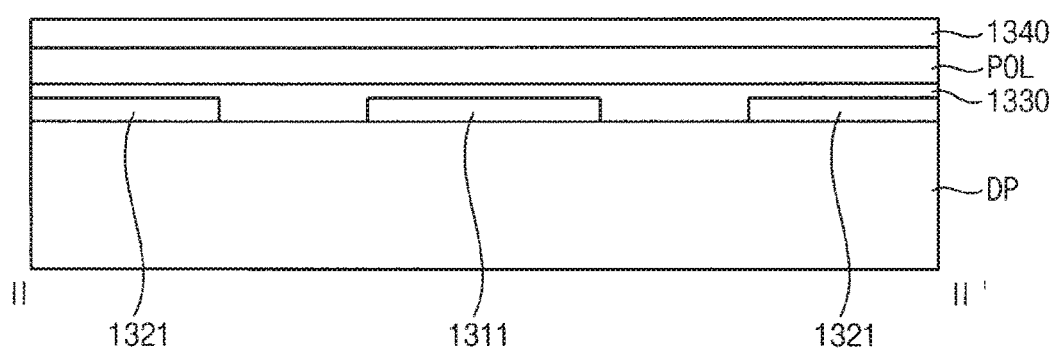

Referring to FIG. 16, a second pressure sensing electrode 1340 may be formed on the polarizer POL.

The second pressure sensing electrode 1340 may overlap the first pressure sensing electrode 1320. The first pressure sensing electrode 1320, the polarizer POL and the second pressure sensing electrode 1340 may sense change in capacitance based on change of a thickness of the polarizer POL.

The second pressure sensing electrode 1340 may include a transparent conductive material. For example, the second pressure sensing electrode 1340 may include indium tin oxide (ITO), indium zinc oxide (IZO), or the like. For another example, the second pressure sensing electrode 1340 may include titanium (Ti), molybdenum titanium (MoTi), or the like.

Referring to FIG. 13, a second insulation layer 1350 may be formed on the second pressure sensing electrode 1340.

The second insulation layer 1350 may cover the second pressure sensing electrode 1340. In other words, the second pressure sensing electrode 1340 might not be exposed and may be insulated by the second insulation layer 1350. The second insulation layer 1350 may prevent the second pressure sensing electrode 1340 from being damaged or corroded.

In some exemplary embodiments, the second insulation layer 1350 may include an inorganic insulating material. For example, the second insulation layer 1350 may include silicon oxide ($SiO_x$), silicon nitride ($SiN_x$), or the like. For example, the second insulation layer 1350 may include silicon oxide ($SiO_x$) and may have a thickness of about 500 Å. In addition, the second insulation layer 1350 may include a plurality of layers, each of which includes a material different from that of the other layers.

Figure 17:
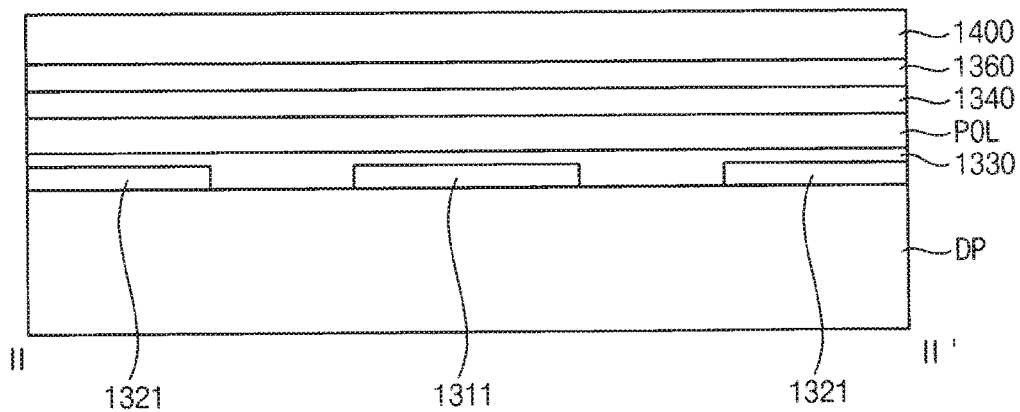
FIG. 17 is a cross-sectional side view of a seventh embodiment of a touch display apparatus constructed according to the principles of the invention.

FIG. 17 illustrates another example of the touch display apparatus taken along line II-II' of FIG. 12.

A touch display apparatus of FIG. 17 may be substantially the same as the touch display apparatus of FIG. 13, except that the touch display apparatus of FIG. 17 further includes a transparent adhesive layer 1360 and a window member 1400. Like reference numerals refer to like elements, and repeated explanations are omitted.

Referring to FIG. 17, the transparent adhesive layer 1360 may be disposed on the second pressure sensing electrode 1340. For example, the transparent adhesive layer 1360 may include an optically clear adhesive (OCA), an optically clear resin (OCR), or the like. The transparent adhesive layer 1360 may attach the second pressure sensing electrode 1340 with the window member 1400.

The window member 1400 may be disposed on the transparent adhesive layer 1360. The window member 1400 may protect the display panel DP. For example, the window member 1400 may include a transparent material. For example, the window member 1400 may include a plurality of base layers. An adhesive layer may be disposed between two adjacent base layers for attaching the two adjacent base layers.

Figure 18:
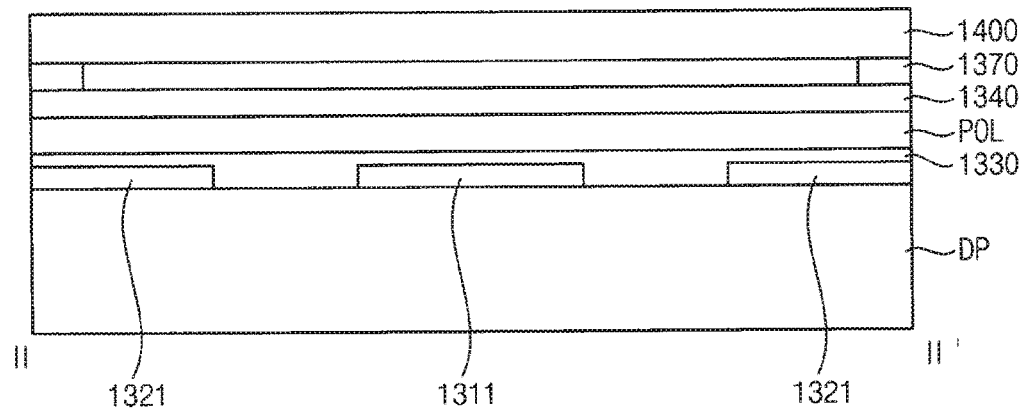
FIG. 18 is a cross-sectional side view of an eighth embodiment of a touch display apparatus constructed according to the principles of the invention.

FIG. 18 illustrates still another example of the touch display apparatus taken along line II-II' of FIG. 12.

A touch display apparatus of FIG. 18 may be substantially the same as the touch display apparatus of FIG. 13, except that the touch display apparatus of FIG. 18 further includes an adhesive member 1370 and a window member 1400. Like reference numerals refer to like elements, and repeated explanations are omitted.

Referring to FIG. 18, the adhesive member 1370 may be disposed on the second pressure sensing electrode 1340. The adhesive member 1370 might be disposed only on the peripheral region PA of the display panel DP, and thus an air gap may be formed between the second pressure sensing electrode 1340 and the window member 1400.

The window member 1400 may be disposed on the adhesive member 1370. The window member 1400 may protect the display panel DP. For example, the window member 1400 may include a transparent material. For example, the window member 1400 may include a plurality of base layers. An adhesive layer may be disposed between two adjacent base layers for attaching the two adjacent base layers.

Figure 19:
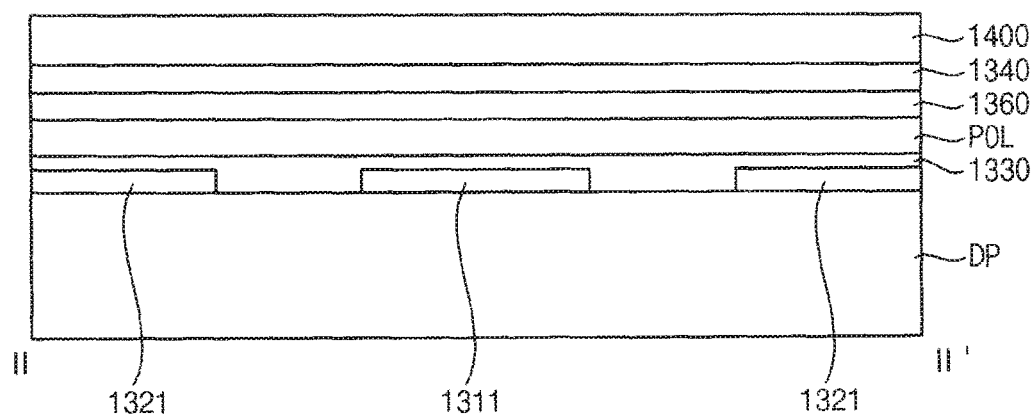
FIG. 19 is a cross-sectional side view of a ninth embodiment of a touch display apparatus constructed according to the principles of the invention.

FIG. 19 illustrates still another example of the touch display apparatus taken along line II-II' of FIG. 12.

A touch display apparatus of FIG. 19 may be substantially the same as the touch display apparatus of FIG. 13, except that the touch display apparatus of FIG. 19 further includes a transparent adhesive layer 1360 and a window member 1400. Like reference numerals refer to like elements, and repeated explanations are omitted.

Referring to FIG. 19, the transparent adhesive layer 1360 may be disposed on the polarizer POL. For example, the transparent adhesive layer 1360 may include an optically clear adhesive (OCA), an optically clear resin (OCR), or the like. The transparent adhesive layer 1360 may attach the second pressure sensing electrode 1340 with the polarizer POL.

The second pressure sensing electrode 1340 may be disposed on the transparent adhesive layer 1360, and the window member 1400 may be disposed on the second pressure sensing electrode 1340. The window member 1400 may protect the display panel DP. For example, the window member 1400 may include a transparent material. For example, the window member 1400 may include a plurality of base layers. An adhesive layer may be disposed between two adjacent base layers for attaching the two adjacent base layers.

Figure 20:
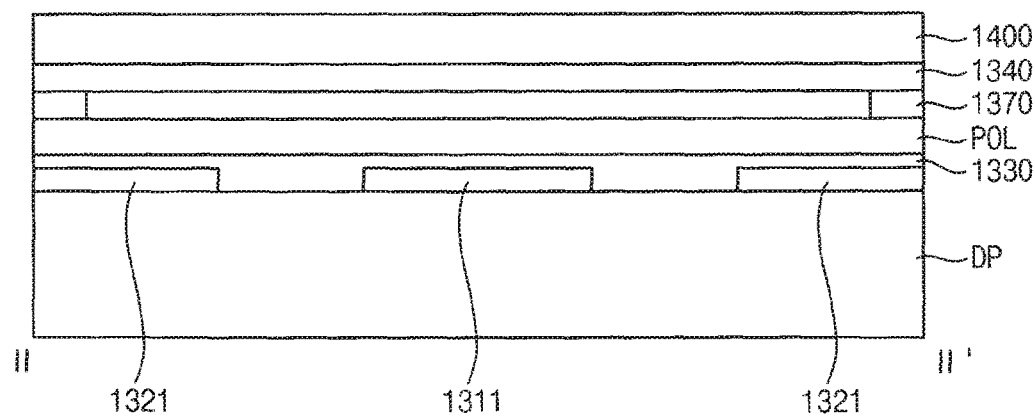
FIG. 20 is a cross-sectional side view of a tenth embodiment of a touch display apparatus constructed according to the principles of the invention.

FIG. 20 illustrates still another example of the touch display apparatus taken along line II-II' of FIG. 12.

A touch display apparatus of FIG. 20 may be substantially the same as the touch display apparatus of FIG. 13, except that the touch display apparatus of FIG. 20 further includes an adhesive member 1370 and a window member 1400. Like reference numerals refer to like elements, and repeated explanations are omitted.

Referring to FIG. 20, the adhesive member 1370 may be disposed on the polarizer POL. The adhesive member 1370 may be disposed only on the peripheral region PA of the display panel DP, and thus an air gap may be formed between the second pressure sensing electrode 1340 and the polarizer POL.

The second pressure sensing electrode 1340 may be disposed on the adhesive member 1370, and the window member 1400 may be disposed on the second pressure sensing electrode 1340. The window member 1400 may protect the display panel DP. For example, the window member 1400 may include a transparent material. For example, the window member 1400 may include a plurality of base layers. An adhesive layer may be disposed between two adjacent base layers for attaching the two adjacent base layers.

Figure 21:
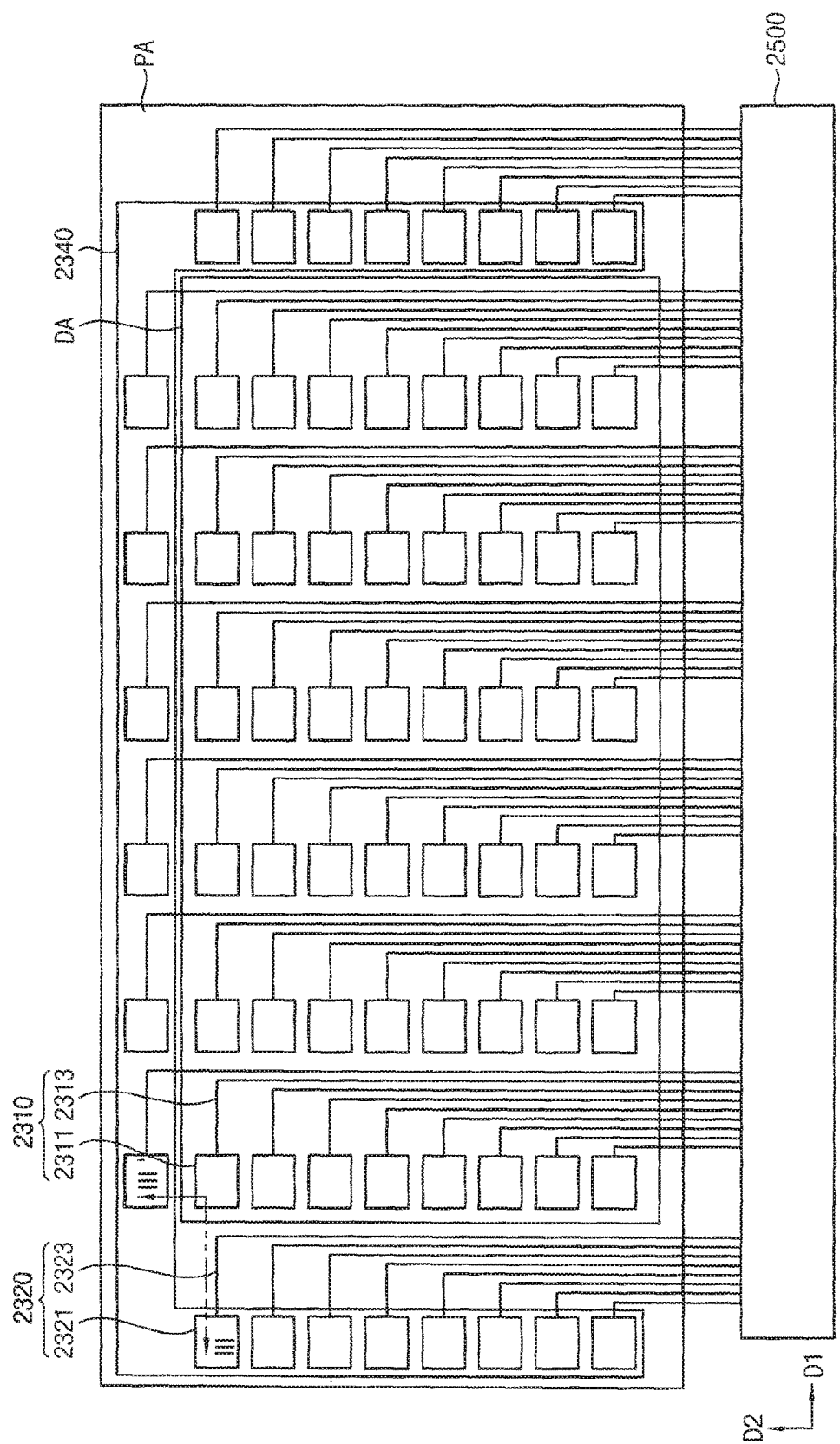
FIG. 21 is a plan view of an eleventh embodiment of a touch display apparatus constructed according to the principles of the invention.
Figure 22:
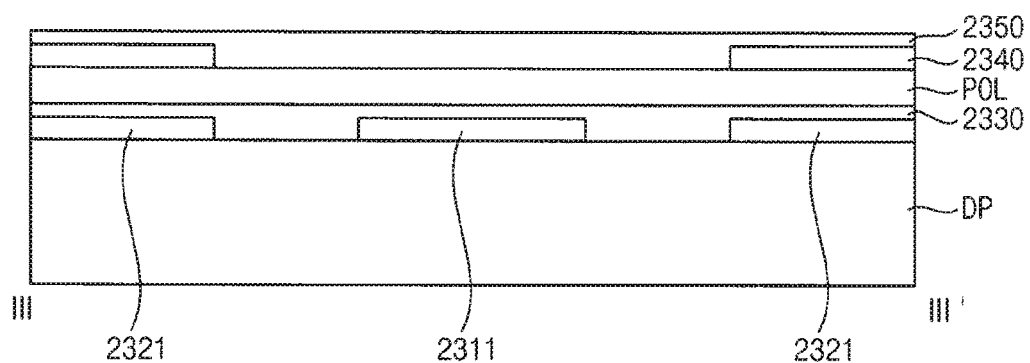
FIG. 22 is a cross-sectional side view of the touch display apparatus of FIG. 21 taken along line III-III' of FIG. 21.

A touch display apparatus of FIGS. 21 and 22 may be substantially the same as the touch display apparatus of FIGS. 1 and 2, except that a configuration of a second pressure sensing electrode 2340 may be changed in the touch display apparatus of FIGS. 21 and 22. Like reference numerals refer to like elements, and repeated explanations are omitted.

Referring to FIGS. 21 and 22, a touch display apparatus according to exemplary embodiments includes a display panel DP, a touch electrode 2310, a first pressure sensing electrode 2320, a polarizer POL, the second pressure sensing electrode 2340 and a sensing driver 2500.

In an example of FIGS. 21 and 22, the second pressure sensing electrode 2340 might be disposed only on the peripheral region PA of the display panel DP. In other words, the second pressure sensing electrode 2340 may be formed corresponding to the first pressure sensing electrode 2320 in the peripheral region PA of the display panel DP.

The second pressure sensing electrode 2340 may include a transparent conductive material. For example, the second pressure sensing electrode 2340 may include indium tin oxide (ITO), indium zinc oxide (IZO), or the like. For another example, the second pressure sensing electrode 2340 may include titanium (Ti), molybdenum titanium (MoTi), or the like.

A second insulation layer 2350 may be disposed on the second pressure sensing electrode 2340. The second insulation layer 2350 may cover the second pressure sensing electrode 2340. In other words, the second pressure sensing electrode 2340 might not be exposed and may be insulated by the second insulation layer 2350. The second insulation layer 2350 may prevent the second pressure sensing electrode 2340 from being damaged or corroded.

In some exemplary embodiments, the second insulation layer 2350 may include an inorganic insulating material. For example, the second insulation layer 2350 may include silicon oxide ($SiO_x$), silicon nitride ($SiN_x$), or the like. The second insulation layer 2350 may include silicon oxide ($SiO_x$) and may have a thickness of about 500 Å. In addition, the second insulation layer 2350 may include a plurality of layers, each of which includes a material different from that of the other layers.

Figure 23:
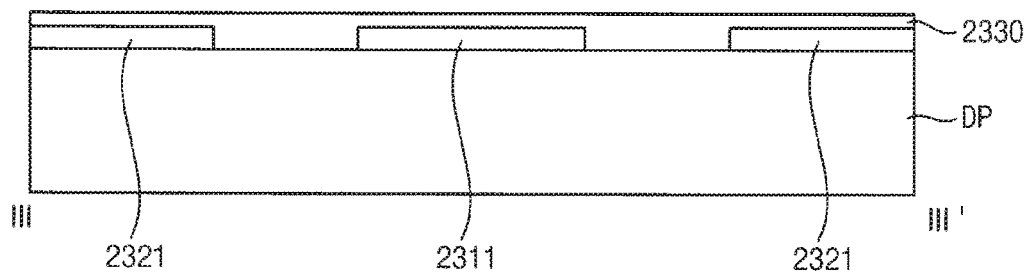
FIGS. 23, 24 and 25 are cross-sectional side views showing sequential steps of an exemplary method of manufacturing the touch display apparatus of FIG. 22.

Referring to FIG. 23, touch patterns 2311 and pressure sensing patterns 2321 may be formed on a display panel DP, and a first insulation layer 2330 may be formed on the touch patterns 2311 and the pressure sensing patterns 2321.

The touch patterns 2311 may include a transparent conductive material. For example, the touch patterns 2311 may include indium tin oxide (ITO), indium zinc oxide (IZO), or the like. For another example, the touch patterns 2311 may include titanium (Ti), molybdenum titanium (MoTi), or the like.

The pressure sensing patterns 2321 may include a transparent conductive material. For example, the pressure sensing patterns 2321 may include indium tin oxide (ITO), indium zinc oxide (IZO), or the like. For another example, the pressure sensing patterns 2321 may include titanium (Ti), molybdenum titanium (MoTi), or the like.

In some exemplary embodiments, the pressure sensing patterns 2321 may include the same material as that of the touch patterns 2311. However, the pressure sensing patterns 2321 may include a material different from that of the touch patterns 2311.

Touch connection wirings 2313 connected to the touch patterns 2311 and pressure sensing connection wirings 2323 connected to the pressure sensing patterns 2321 may also be formed on the display panel DP. The touch patterns 2311 and the touch connection wirings 2313 may form a touch electrode 2310, and the pressure sensing patterns 2321 and the pressure sensing connection wirings 2323 may form a first pressure sensing electrode 2320.

The first insulation layer 2330 may cover the touch electrode 2310 and the first pressure sensing electrode 2320. In other words, the touch electrode 2310 and the first pressure sensing electrode 2320 might not be exposed and may be insulated by the first insulation layer 2330. The first insulation layer 2330 may prevent the touch electrode 2310 and the first pressure sensing electrode 2320 from being damaged or corroded.

In some exemplary embodiments, the first insulation layer 2330 may include an inorganic insulating material. For example, the first insulation layer 2330 may include silicon oxide ($SiO_x$), silicon nitride ($SiN_x$), or the like. The first insulation layer 2330 may include silicon oxide ($SiO_x$) and may have a thickness of about 500 Å. In addition, the first insulation layer 2330 may include a plurality of layers, each of which includes a material different from that of the other layers.

Figure 24:
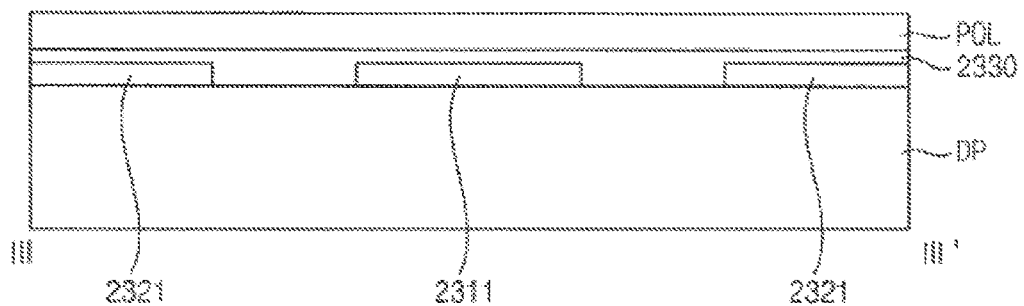

Referring to FIG. 24, a polarizer POL may be formed on the first insulation layer 2330 (e.g., on the touch electrode 2310 and the first pressure sensing electrode 2320).

The polarizer POL may include a linear polarization member and a phase retardation film disposed below the linear polarization member. The polarizer POL may include a base film including a dielectric elastomer material.

The base film including the dielectric elastomer material may include a material having restoring force and flexibility. In addition, the base film may include a dielectric material having predetermined permittivity for measuring a capacitance value. For example, the base film may include polyvinylidene fluoride (PVDF), polydimethyl siloxan (PDMS), polyvinylidene fluoride-co-trifluoroethylene (PVFT), or the like.

Figure 25:
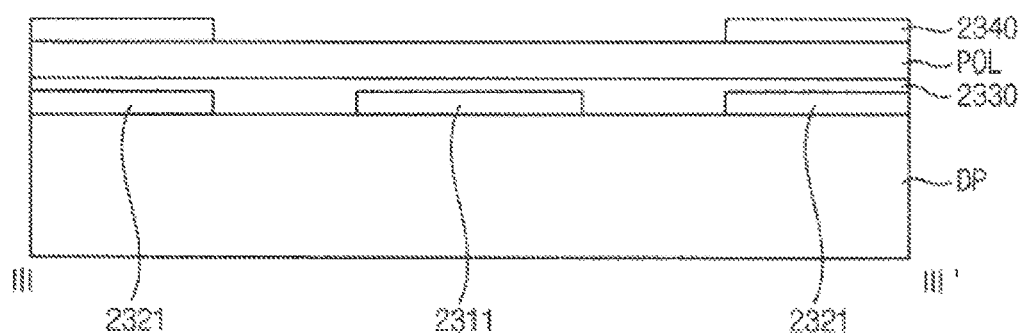

Referring to FIG. 25, a second pressure sensing electrode 2340 is formed on the polarizer POL The second pressure sensing electrode 2340 may overlap the first pressure sensing electrode 2320. The first pressure sensing electrode 2320, the polarizer POL and the second pressure sensing electrode 2340 may sense change in capacitance based on change of a thickness of the polarizer POL.

The second pressure sensing electrode 2340 may include a transparent conductive material. For example, the second pressure sensing electrode 2340 may include indium tin oxide (ITO), indium zinc oxide (IZO), or the like. For another example, the second pressure sensing electrode 2340 may include titanium (Ti), molybdenum titanium (MoTi), or the like.

Referring to FIG. 22, a second insulation layer 2350 may be formed on the second pressure sensing electrode 2340.

The second insulation layer 2350 may cover the second pressure sensing electrode 2340. In other words, the second pressure sensing electrode 2340 might not be exposed and may be insulated by the second insulation layer 2350. The second insulation layer 2350 may prevent the second pressure sensing electrode 2340 from being damaged or corroded.

In some embodiments, the second insulation layer 2350 may include an inorganic insulating material. For example, the second insulation layer 2350 may include silicon oxide ($SiO_x$), silicon nitride ($SiN_x$), or the like. For example, the second insulation layer 2350 may include silicon oxide ($SiO_x$) and may have a thickness of about 500 Å. In addition, the second insulation layer 2350 may include a plurality of layers, each of which includes a material different from that of the other layers.

Figure 26:
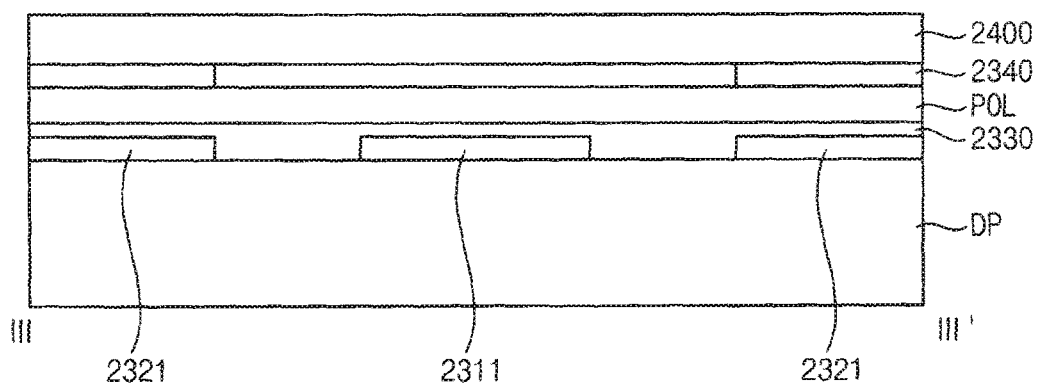
FIG. 26 is a cross-sectional side view of a twelfth embodiment of a touch display apparatus constructed according to the principles of the invention.

FIG. 26 illustrates another example of the touch display apparatus taken along line III-III' of FIG. 21.

A touch display apparatus of FIG. 26 may be substantially the same as the touch display apparatus of FIG. 22, except that the touch display apparatus of FIG. 26 further includes a window member 2400. Like reference numerals refer to like elements, and repeated explanations are omitted.

Referring to FIG. 26, the window member 2400 may be disposed on the second pressure sensing electrode 2340. The second pressure sensing electrode 2340 might be disposed only on the peripheral region PA of the display panel DP, and thus an air gap may be formed between the polarizer POL and the window member 2400.

The window member 2400 may protect the display panel DP. For example, the window member 2400 may include a transparent material. The window member 2400 may include a plurality of base layers. An adhesive layer may be disposed between two adjacent base layers for attaching the two adjacent base layers.

Figure 27:
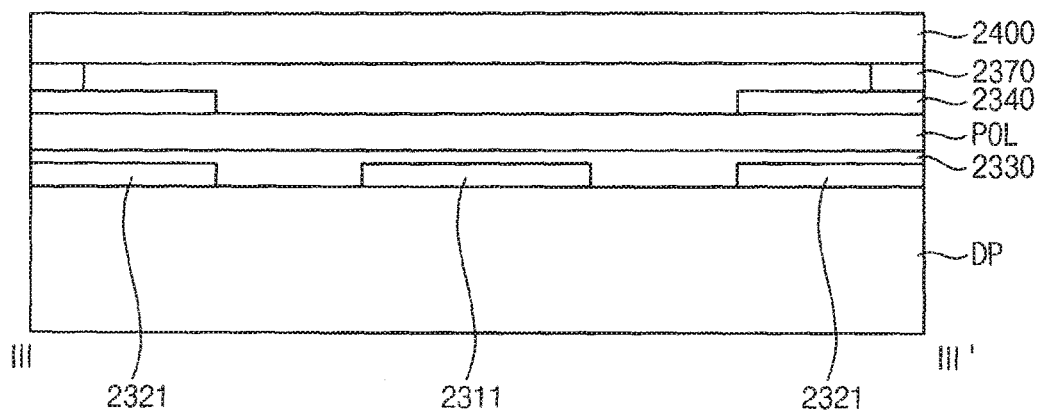
FIG. 27 is a cross-sectional side view of a thirteenth embodiment of a touch display apparatus constructed according to the principles of the invention.

FIG. 27 illustrates still another example of the touch display apparatus taken along line III-III' of FIG. 21.

A touch display apparatus of FIG. 27 may be substantially the same as the touch display apparatus of FIG. 22, except that the touch display apparatus of FIG. 27 further includes an adhesive member 2370 and a window member 2400. Like reference numerals refer to like elements, and repeated explanations are omitted.

Referring to FIG. 27, the adhesive member 2370 may be disposed on the second pressure sensing electrode 2340. The second pressure sensing electrode 2340 and the adhesive member 2370 might be disposed only on the peripheral region PA of the display panel DP, and thus an air gap may be formed between the polarizer POL and the window member 2400.

The window member 2400 may be disposed on the adhesive member 2370. The window member 2400 may protect the display panel DP. For example, the window member 2400 may include a transparent material. For example, the window member 2400 may include a plurality of base layers. An adhesive layer may be disposed between two adjacent base layers for attaching the two adjacent base layers.

The touch display apparatus according to exemplary embodiments may include the touch electrode disposed on the display region DA and the first pressure sensing electrode disposed on the peripheral region PA. The touch electrode and the first pressure sensing electrode may be disposed in the same layer and may be connected to the same sensing driver, and thus the same signal (e.g., a touch sensing signal) may be applied to the touch electrode and the first pressure sensing electrode. Accordingly, a parasitic capacitance of a peripheral touch pattern may be substantially the same as a parasitic capacitance of a central touch pattern, and a touch distortion may thus be reduced or prevented at the peripheral region.

The touch display apparatus according to exemplary embodiments may include the first pressure sensing electrode, the second pressure sensing electrode and the polarizer. The polarizer may be disposed between the first pressure sensing electrode and the second pressure sensing electrode, and may include a dielectric elastomer material. Accordingly, an additional dielectric elastomer layer may be omitted, and thus the thickness of the touch display apparatus and manufacturing costs may be reduced.

The touch display apparatus constructed according to the principles of the invention may include the touch electrode, the first pressure sensing electrode and the second pressure sensing electrode. Accordingly, an electrical contact (e.g., a touch position) and a pressure may be efficiently sensed.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A touch display apparatus comprising:
a display panel comprising a display region and a peripheral region, the display panel configured to display an image;
a touch electrode disposed on the display region of the display panel and comprising a plurality of touch patterns, the touch electrode being configured to detect a touch position;
a first pressure sensing electrode disposed on the peripheral region of the display panel, the touch electrode and the first pressure sensing electrode being disposed in a same layer;
a second pressure sensing electrode overlapping the first pressure sensing electrode; and
a polarizer disposed, in a direction normal to a surface of the display panel, between the second pressure sensing electrode and the same layer in which the touch electrode and the first pressure sensing electrode are disposed, the polarizer comprising a dielectric elastomer material.

2. The touch display apparatus of claim 1, wherein the first pressure sensing electrode comprises a plurality of pressure sensing patterns.

3. The touch display apparatus of claim 1, wherein the second pressure sensing electrode is disposed only on the peripheral region of the display panel.

4. The touch display apparatus of claim 1, further comprising:
a sensing driver configured to generate signals, the sensing driver being connected to the touch electrode and the first pressure sensing electrode,
wherein the touch electrode and the first pressure sensing electrode are configured to receive substantially the same signal from the sensing driver.

5. The touch display apparatus of claim 1, further comprising:
a window member disposed on the second pressure sensing electrode.

6. The touch display apparatus of claim 5, further comprising:
a transparent adhesive layer disposed between the window member and the second pressure sensing electrode.

7. The touch display apparatus of claim 5, further comprising:
a transparent adhesive layer disposed between the second pressure sensing electrode and the polarizer.

8. The touch display apparatus of claim 5, further comprising:
an adhesive member disposed on the peripheral region of the display panel, the adhesive member being disposed between the window member and the second pressure sensing electrode.

9. The touch display apparatus of claim 5, further comprising:
an adhesive member disposed on the peripheral region of the display panel, the adhesive member being disposed between the second pressure sensing electrode and the polarizer.

10. The touch display apparatus of claim 1, wherein the touch electrode, the first pressure sensing electrode, and the second pressure sensing electrode comprise the same material.

11. A method of manufacturing a touch display apparatus, the method comprising:
forming a display panel including a display region and a peripheral region, the display panel configured to display an image;
forming a touch electrode and a first pressure sensing electrode on the display panel;
forming a polarizer on the touch electrode and the first pressure sensing electrode, the polarizer including a dielectric elastomer material; and
forming a second pressure sensing electrode on the polarizer, the polarizer being disposed, in a direction normal to a surface of the display panel, between the second pressure sensing electrode and the first pressure sensing electrode,
wherein the touch electrode is disposed on the display region of the display panel, the touch electrode comprises a plurality of touch patterns, and
wherein the first pressure sensing electrode is disposed on the peripheral region of the display panel.

12. The method of claim 11, wherein the first pressure sensing electrode comprises a plurality of pressure sensing patterns.

13. The method of claim 11, wherein the second pressure sensing electrode is disposed only on the peripheral region of the display panel.

14. The method of claim 11, further comprising:
forming a sensing driver connected to the touch electrode and the first pressure sensing electrode,
wherein the sensing driver is configured to apply a same signal to the touch electrode and the first pressure sensing electrode.

15. The method of claim 11, further comprising:
forming a window member disposed on the second pressure sensing electrode.

16. The method of claim 15, further comprising:
forming a transparent adhesive layer between the window member and the second pressure sensing electrode.

17. The method of claim 15, further comprising:
forming a transparent adhesive layer between the second pressure sensing electrode and the polarizer.

18. The method of claim 15, further comprising:
forming an adhesive member on the peripheral region of the display panel, the adhesive member being disposed between the window member and the second pressure sensing electrode.

19. The method of claim 15, further comprising:
forming an adhesive member on the peripheral region of the display panel, the adhesive member being disposed between the second pressure sensing electrode and the polarizer.

20. A method of operating a touch display apparatus, the method comprising:
displaying an image via a display panel of the touch display apparatus, the display panel comprising a display region and a peripheral region, the touch display apparatus further comprising:
a touch electrode disposed on the display region, the touch electrode being configured to detect a position of a touch interaction;
a first pressure sensing electrode disposed on the peripheral region;
a second pressure sensing electrode disposed on the display panel;
a polarizer disposed, in a direction normal to a surface of the display panel, between the second pressure sensing electrode and the first pressure sensing electrode; and
a sensing driver configured to generate driving signals, the sensing driver being connected to the touch electrode and the pressure sensing electrode;
applying, via the sensing driver, a same driving signal to the touch electrode and the pressure sensing electrode; and
detecting the position and a pressure of the touch interaction in accordance with the application of the same driving signal.

* * * * *